(12) United States Patent
Nakamura et al.

(10) Patent No.: US 10,011,167 B2
(45) Date of Patent: Jul. 3, 2018

(54) SEAL STRUCTURE FOR FUEL TANK

(71) Applicant: Yachiyo Industry Co., Ltd., Saitama (JP)

(72) Inventors: Kazuhiro Nakamura, Saitama (JP); Kazuaki Shoji, Saitama (JP)

(73) Assignee: Yachiyo Industry Co., Ltd., Saitama (JP)

( * ) Notice: Subject to any disclaimer, the term of this patent is extended or adjusted under 35 U.S.C. 154(b) by 289 days.

(21) Appl. No.: 14/893,261

(22) PCT Filed: Nov. 18, 2014

(86) PCT No.: PCT/JP2014/080419
§ 371 (c)(1),
(2) Date: Nov. 23, 2015

(87) PCT Pub. No.: WO2015/079960
PCT Pub. Date: Jun. 4, 2015

(65) Prior Publication Data
US 2016/0332512 A1    Nov. 17, 2016

(30) Foreign Application Priority Data

Nov. 28, 2013  (JP) ................. 2013-246083
Nov. 28, 2013  (JP) ................. 2013-246084
Nov. 28, 2013  (JP) ................. 2013-246085

(51) Int. Cl.
*B60K 15/03*  (2006.01)
*F02M 37/00*  (2006.01)
*F02M 37/10*  (2006.01)

(52) U.S. Cl.
CPC .. *B60K 15/03006* (2013.01); *B60K 15/03177* (2013.01); *B60K 2015/03447* (2013.01);
(Continued)

(58) Field of Classification Search
CPC .... B60K 15/03177; B60K 2015/03447; F02M 37/0017
See application file for complete search history.

(56) References Cited

U.S. PATENT DOCUMENTS 8,863,976 B2    10/2014  Isayama

FOREIGN PATENT DOCUMENTS

CN    203023599         6/2013
JP    2002362609 A2    12/2002
(Continued)

OTHER PUBLICATIONS

International Search Report dated Jan. 6, 2015 filed in PCT/JP2014/080419.

*Primary Examiner* — Jeffrey Allen
(74) *Attorney, Agent, or Firm* — Rankin, Hill & Clark LLP

(57) ABSTRACT

A seal structure includes: a tubular protrusion communicating with an inside of a resin tank body and projecting from the tank body; a mouth member being fixed along an inner peripheral surface of the protrusion; a lid member including a second tubular portion inserted from one end into the mouth member, a flange portion covering the other end of the second tubular portion, and a third tubular portion extending toward the insertion direction of the second tubular portion; a supporting surface provided to an outer peripheral side of the protrusion or the fuel tank body; and a ring-shaped sealing member supported on the ring-shaped shoulder surface and held between an outer peripheral surface of the protrusion and an inner peripheral surface of the third tubular portion in a state where the lid member is attached to the mouth member.

17 Claims, 11 Drawing Sheets

(52) U.S. Cl.
CPC ............ *B60K 2015/03453* (2013.01); *B60K 2015/03493* (2013.01); *F02M 37/0076* (2013.01); *F02M 37/103* (2013.01)

(56) References Cited

FOREIGN PATENT DOCUMENTS

| | | | |
|---|---|---|---|
| JP | 2011153603 | A2 | 8/2011 |
| WO | 2012018108 | A1 | 2/2012 |

FIG. 6
(a)
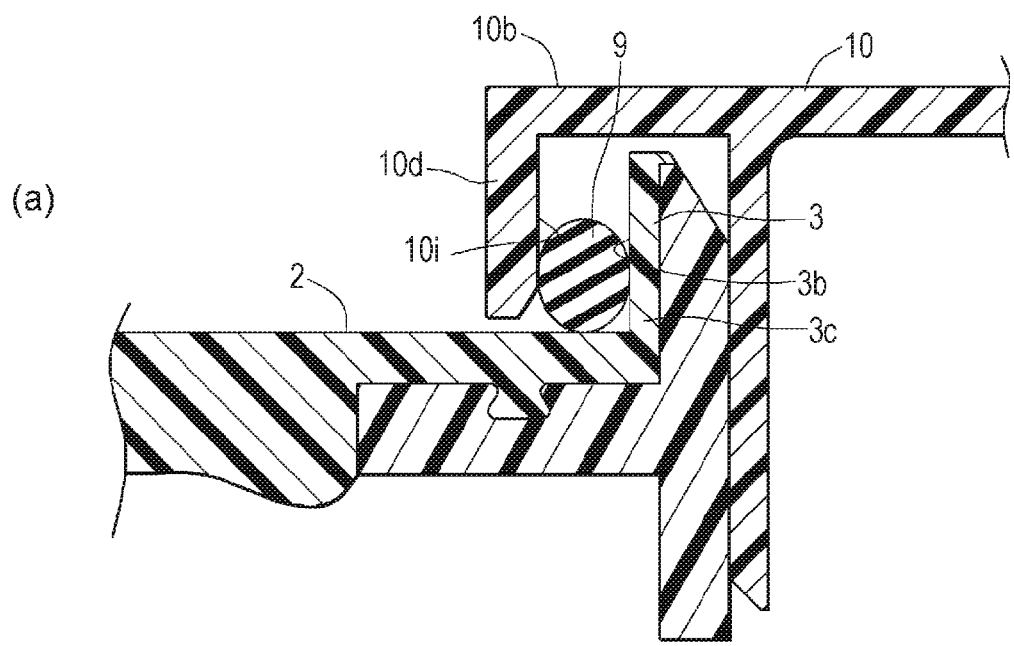
(b)
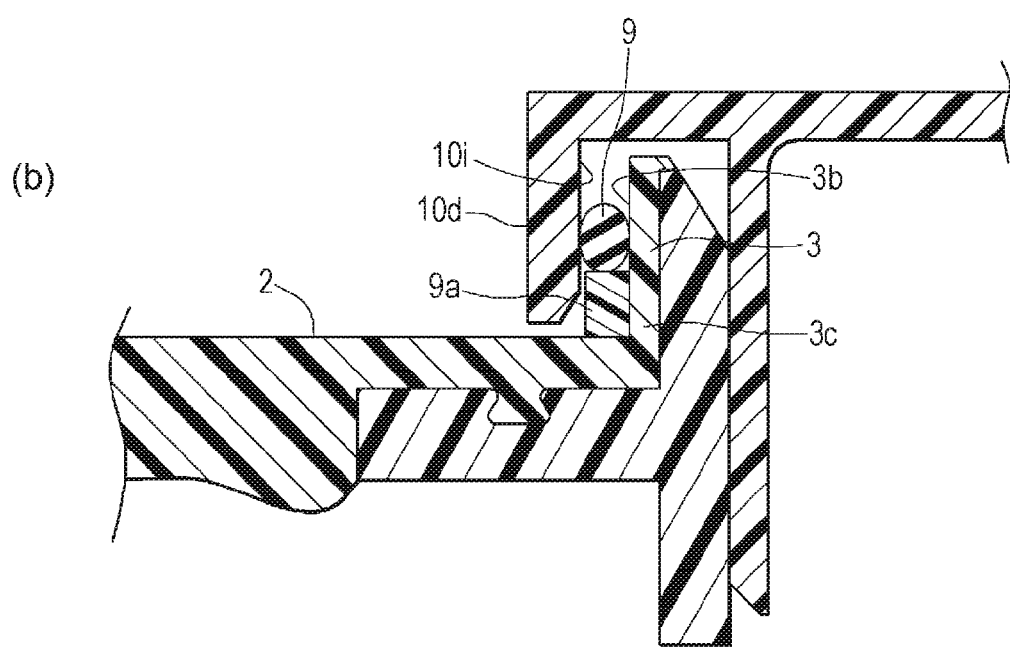

FIG. 8
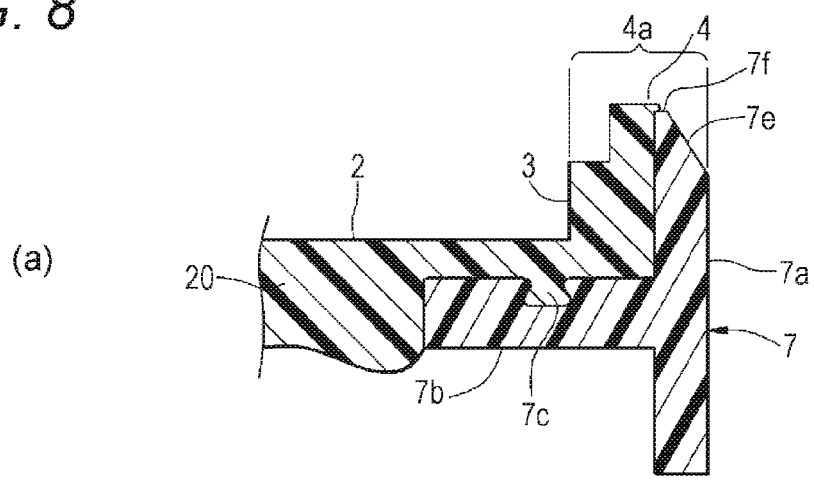
(a)
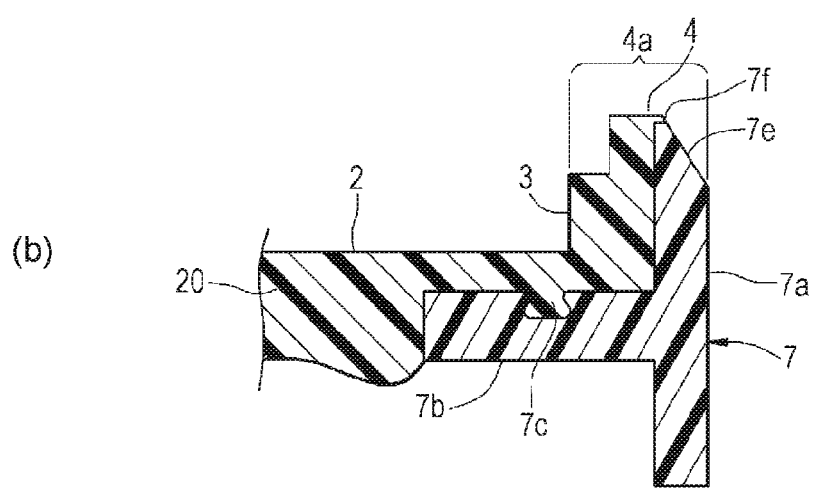
(b)
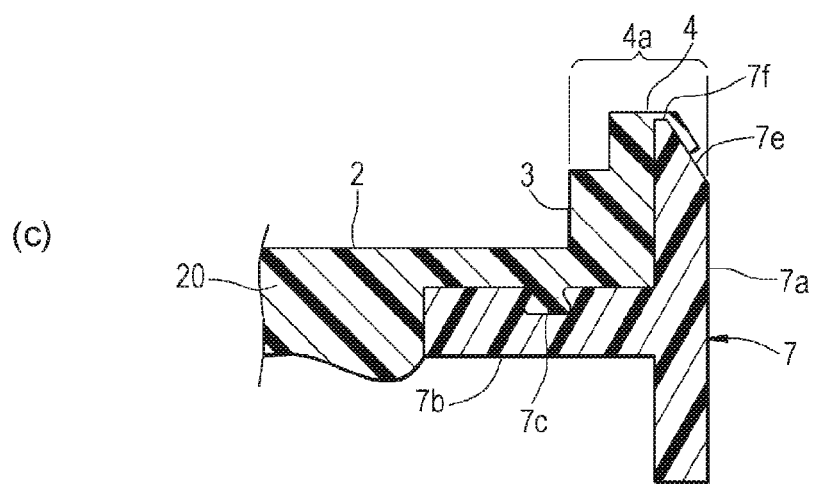
(c)

SEAL STRUCTURE FOR FUEL TANK

TECHNICAL FIELD

The present invention relates to a seal structure for a fuel tank that seals a fuel tank oil-tightly.

BACKGROUND ART

Typically, a fuel tank made of an iron plate has been the mainstream of a fuel tank mounted in a passenger vehicle or the like. In recent years, however, the number of fuel tanks made of resin is increasing from the viewpoints of weight reduction, rust prevention, ease of molding, and the like. The blow molding method that is easy to mold hollow bodies is heavily used for the production of resin fuel tanks. A tubular parison formed by melting down thermoplastic resin is extruded. Air is then blown into the parison held by a mold for molding. Accordingly, a molded part of a desired shape can be obtained.

Generally, a protrusion protruding outward is formed on a fuel tank in the blow molding process. An opening is formed in the protrusion in the subsequent fabrication process. A lid member to which a functional component such as a fuel pump is fixed is mounted on the protrusion. An oil-tight sealing is provided between the protrusion and the lid member to prevent fuel or gas from leaking from the opening when the lid member is mounted on the protrusion.

An example of such a seal structure is disclosed (Patent Literature 1). In this example, the lid member includes a tubular portion accommodated in an opening portion, an outer flange portion that closes an upper end of the tubular portion and projects from the tubular portion toward the outer periphery, and a sealing member mounting portion extending downward from an outer end of the outer flange portion, on which a ring-shaped sealing member is mounted. A flanged sleeve includes a sleeve portion in intimate contact with a neck portion, and an inner flange portion whose lower end of the sleeve portion projects toward the outer periphery to be in intimate contact with an inner wall of a tank body. The flanged sleeve is made of a resin with higher heat resistance than a resin forming the tank body. The tubular portion is accommodated inside the sleeve portion when the opening portion is blocked with the lid member. The outer flange portion comes into contact with upper ends of the neck portion and the sleeve portion to bring an inner peripheral side of the sealing member into intimate contact with an outer peripheral side of the neck portion. In Patent Literature 1, such a seal structure is adopted to eliminate the need of a fastening structure such as a screw portion. Accordingly, a seal structure can be obtained which eliminates the need of, for example, the control of tightening torque and axial force upon fastening, and that facilitates the control of mounting, demounting, and the like of the lid member.

CITATION LIST

Patent Literature

Patent Literature 1: WO 2012/018108 A

SUMMARY OF THE INVENTION

Problems to be Solved by the Invention

However, in the seal structure disclosed in Patent Literature 1, the lid member includes an extension portion extending downward from the outer end of the outer flange portion, and further includes the sealing member mounting portion that has an L-shaped cross section and projects from a lower end of the extension portion in a radially inward direction of the flange portion. The structure of the lid member is very complicated. Especially in the configuration of projecting from the lower end of the extension portion in the radially inward direction of the flange portion, it is difficult to readily mold the lid member in one piece by injection molding. For example, the number of molds used for production is increased; their shapes become complicated; it is necessary to form the lid member with a plurality of pieces and join them. Therefore, the production cost increases. Moreover, in Patent Literature 1, the sealing member mounting portion includes a recess recessed in the outer peripheral direction in an inner peripheral surface of the lid member. The sealing member is mounted in the recess. Therefore, when the sealing member is mounted, the work of pressing the sealing member into the recess is required. Accordingly, the production process becomes complicated.

The present invention has been contrived to solve such problems of the known technology. A main object of the present invention is to provide a seal structure for a fuel tank that promotes cost reduction with a simple configuration and includes advanced sealing performance.

Solutions to the Problems

A seal structure for a fuel tank (1) according to the present invention, includes: a tubular protrusion (3) communicating with an inside of a resin fuel tank body (2) and projecting from the fuel tank body; a mouth member (7) being fixed along an inner peripheral surface of the protrusion and including a first tubular portion (7a); a lid member (10) including a second tubular portion (10a) inserted from one end into the mouth member along an inner peripheral surface of the first tubular portion, a flange portion (10b) covering the other end of the second tubular portion and being extended on an outer peripheral side of the second tubular portion, and a third tubular portion (downward hanging portion 10d) extending from an outer peripheral side of the flange portion toward the insertion direction of the second tubular portion; a supporting surface (3a) provided to an outer peripheral side of the protrusion or the fuel tank body in such a manner as to face a protruding direction of the protrusion; and a ring-shaped sealing member (9) supported on the supporting surface and held between an outer peripheral surface (first sealing surface 3b) of the protrusion and an inner peripheral surface (second sealing surface 10i) of the third tubular portion in a state where the lid member is attached to the mouth member.

In this manner, in this configuration, the second tubular portion of the lid member is inserted on the inner peripheral side of the first tubular portion fixed to the inner peripheral side of the protrusion. A sealing member is held between the outer peripheral surface of the protrusion and the inner peripheral surface of the third tubular portion of the lid member while being supported on the supporting surface on the outer peripheral side of the protrusion. Accordingly, it becomes possible to promote cost reduction with the lid member having a simplified configuration, and provide a reliable sealing of a fuel tank simply by inserting the lid member into the mouth member.

The supporting surface (3a) includes a ring-shaped shoulder surface (3a) formed on the protrusion between an opening end (4) of the protrusion (3) and the mouth member (7), and the fuel tank body (2).

Consequently, a worker can attach the sealing member simply by placing the ring-shaped sealing member on the ring-shaped shoulder surface formed on the protrusion in the production process of the fuel tank (1).

The supporting surface is provided all around the protrusion (3).

Consequently, it is prevented that part of the sealing member is displaced downward and the sealing member deforms when the lid member is mounted on the protrusion. Thus, it becomes possible to obtain reliable sealing performance.

A gap is formed between an end of the protrusion (3) in the projecting direction and the flange portion (10*b*) in a state where the lid member (10) is mounted on the mouth member (7).

Consequently, the lid member is given play in the up-and-down direction in the state where the lid member is mounted on the protrusion. In the production process of the fuel tank, it becomes possible to securely lock the lid member by snap-fit without strictly controlling the height of the opening end of the protrusion in the up-and-down direction.

The mouth member (7) includes a resin material having higher hardness than a resin material included in the protrusion (3).

Consequently, substantial radial hardness of the protrusion is ensured. Creep deformation that resin deforms permanently due to a reaction force of the sealing member can be suppressed.

An end of the mouth member includes an acute portion (7*f*) extended circumferentially at an edge on the opening end (4) side where the protrusion is open, and an inclined surface (7*e*) inclined radially from the acute portion.

Consequently, it becomes possible to readily remove resin (a parison) remaining inward of the opening end at the acute portion or the inclined surface after molding the fuel tank body and the protrusion by blow molding. Therefore, an opening is readily formed in the protrusion of the fuel tank. A reduction in cost of the fuel tank can be promoted.

The inclined surface (7*e*) is formed into a tapered shape that is progressively increased in inner diameter of the mouth member (7) toward the opening end (4).

Consequently, when a mold is pressed against the mouth member in the production process of the fuel tank 1, the mold enters the mouth member along the tapered shape formed at the mouth member. Thus, it becomes possible to readily position the mold and the mouth member.

An edge of the protrusion (3) is located on the acute portion (7*f*) or the inclined surface (7*e*).

Consequently, the resin material included in the protrusion covers the opening end. Thus, it becomes possible to protect the mouth member on the opening end side.

A thickness of the protrusion (3) on the acute portion (7*f*) or the inclined surface (7*e*) is formed to be thinner than that of the fuel tank body (2) or the other part of the protrusion.

Consequently, it becomes possible to readily remove the resin remaining inward of the opening end by cutting a portion having thinner resin at the acute portion or the inclined surface.

One of the first tubular portion and the second tubular portion is provided circumferentially with a plurality of engaging claws (7*d*, 10*p*) protruding toward the other. The other of the first tubular portion and the second tubular portion is provided, at positions corresponding to the engaging claws, with engaged portions (10*c*, 7*j*) where the engaging claws enter. The second tubular portion is inserted axially along the first tubular portion to engage the engaging claws in the engaged portions and mount the lid member on the protrusion. In the state where the lid member is mounted on the protrusion, the lid member is rotated circumferentially to separate the engaged portions from the engaging claws, and accordingly, the lid member is allowed to be removed from the protrusion.

With such an engagement configuration, it becomes possible to mount the lid member on the protrusion with the simple operation of inserting the lid member into the protrusion. Furthermore, it becomes possible to remove the lid member from the protrusion with the simple operation of rotating the lid member circumferentially in the state where the lid member is mounted.

Each engaged portion (10*c*, 7*j*) includes a through hole penetrating the first tubular portion (7*a*) or the second tubular portion (10*a*).

Consequently, the simple configuration where the through holes are provided enables the lid member to be mounted on and fixed to the protrusion.

Each engaged portion (10*c*, 7*j*) includes a recess recessed in the inner peripheral surface of the first tubular portion (7*a*) or an outer peripheral surface of the second tubular portion (10*a*).

Consequently, the simple configuration where the recesses are provided to the first tubular portion or the second tubular portion (10*a*) enables the lid member to be mounted on and fixed to the protrusion.

Each engaging claw (7*d*, 10*p*) includes a first inclined surface (7*db*) inclined circumferentially from a protrusion end (7*da*) protruding from an inner surface of the first tubular portion (7*a*) toward an inner peripheral surface (7*i*) of the first tubular portion, or from a protrusion end protruding from an outer surface of the second tubular portion (10*a*) toward an outer peripheral surface of the second tubular portion.

Consequently, a moving piece provided to the lid member is gradually mounted onto the first inclined surface by rotating the lid member circumferentially, and accordingly, it becomes possible to separate the engaged portion from the engaging claw.

Each engaging claw (7*d*, 10*p*) has a wedge shape including a parallel surface (7*dd*, 10*pb*) parallel to a radial direction of the first tubular portion (7*a*), and a second inclined surface (7*dc*, 10*pa*) formed on a surface opposite to the parallel surface and progressively reduced in thickness in between with the parallel surface toward a direction in which the engaging claw protrudes.

Consequently, it becomes possible to easily mount the lid member on the protrusion by what is called snap-fit. Furthermore, when the lid member is mounted on the protrusion, it becomes possible to promote the prevention of the pullout of the lid member.

The seal structure for a fuel tank further includes: a predetermined functional component (15) mounted on the lid member (10); and a biasing member (16) configured to bias the lid member, together with the functional component, from the inside of the fuel tank body (2) toward an opening end (4) of the protrusion (3). The biasing member brings the parallel surface (7*dd*) and the engaged portion (10*c*) into axial contact with each other to fix the lid member to the protrusion.

Consequently, it becomes possible to fix the lid member securely and axially to the protrusion.

The second tubular portion (10*a*) has a plurality of notch portions (10*f*, 10*g*) extended axially from a distal end thereof, the notch portions being formed circumferentially.

The engaging claw (10p) or the engaged portion (10c) is provided to a moving piece (10m) defined by two notch portions.

Consequently, the moving piece sandwiched between the two notch portions becomes radially displaceable. Accordingly, it becomes possible to easily engage and separate the engaging claw to or from the engaged portion.

The engaging claws (7d) are provided to the first tubular portion (7a). The engaged portions (10c) are provided to the second tubular portion (10a). When the lid member (10) is rotated circumferentially in the state where the lid member is mounted on the protrusion (3), each engaging claw enters the notch portion (10f) after being separated from each engaged portion to allow the lid member to be removed from the protrusion.

Consequently, the notch portion functions as a guide. Accordingly, it becomes possible to remove the lid member from the protrusion along the notch portion.

When, in a state where the engaging claw (7d) and the engaged portion (10c) are in engagement, the notch portion on a circumferentially closer side to the first inclined surface (7db) of the engaging claw is a first notch portion (10f), and the notch portion on a farther side is a second notch portion (10g), the first notch portion has a circumferentially larger notch width than the second notch portion.

Consequently, it becomes possible to guide the engaging claw with the first notch portion having a larger notch width.

Advantageous Effects of the Invention

According to the present invention, it becomes possible to promote cost reduction and weight reduction with a lid member having a simplified configuration, and provide a reliable sealing between an outer peripheral surface of a protrusion provided to a fuel tank, and an inner peripheral surface of a flange portion of the lid member simply by inserting the lid member into a mouth member.

BRIEF DESCRIPTION OF THE DRAWINGS

FIG. 6(a) is a main part enlarged view illustrating a first modification of the seal structure, and FIG. 6(b) is a main part enlarged view of a second modification of the seal structure.

FIGS. 8(a) to 8(c) are explanatory views illustrating positions to cut away a parison in the production process of the fuel tank.

DESCRIPTION OF EMBODIMENT

An embodiment of the present invention is described hereinafter with reference to the drawings. In the following description, directions shall be pursuant to indications of directions in each drawing in principle. However, terms "circumferentially," "radially (radially inward direction and radially outward direction)," and "axially" may be used since main components of the present invention have cylindrical shapes. "Axially" may be expressed as the "insertion direction."

Figure 1:
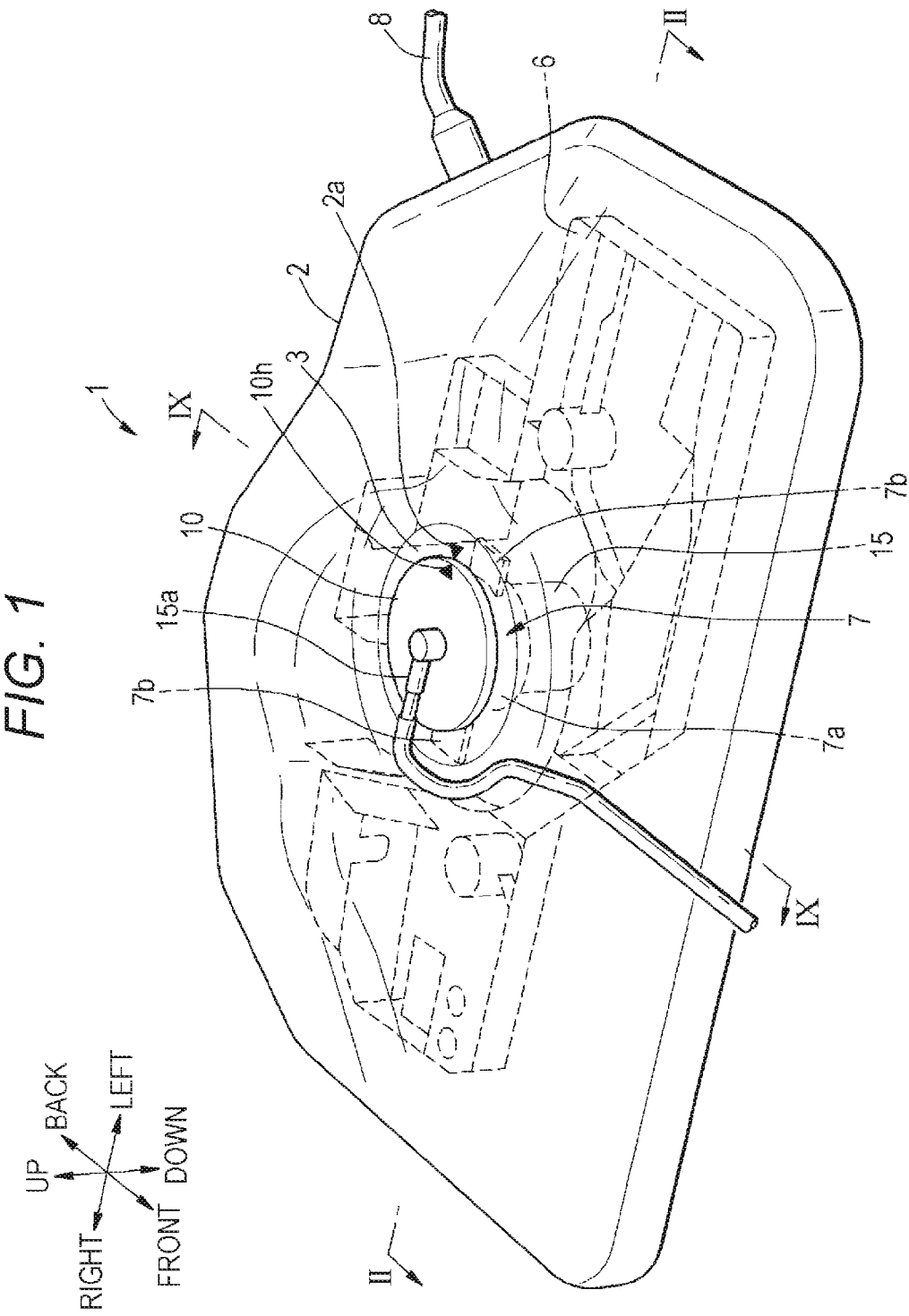
FIG. 1 is a perspective view illustrating an entire configuration of a fuel tank according to a first embodiment of the present invention.
Figure 2:
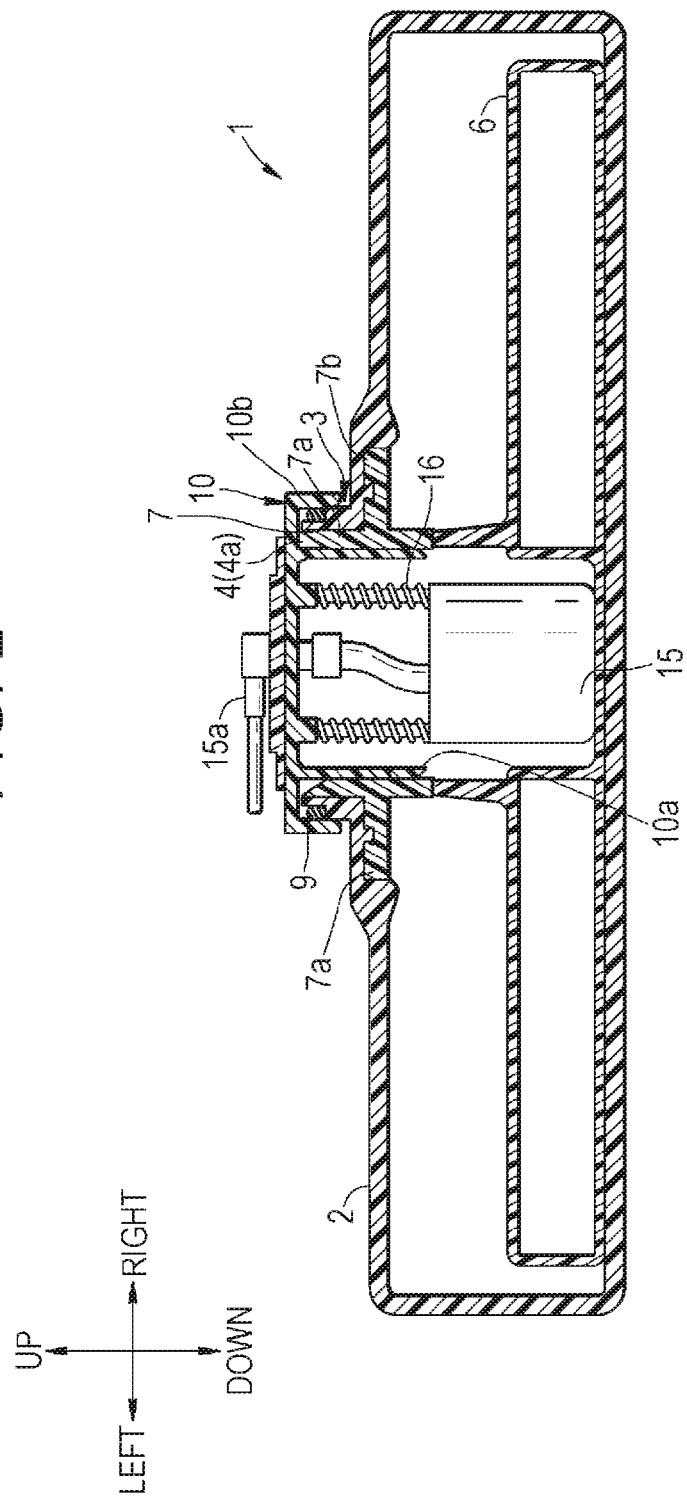
FIG. 2 is a cross-sectional view of the fuel tank.

FIG. 1 is a perspective view illustrating an entire configuration of a fuel tank 1 according to a first embodiment of the present invention. FIG. 2 is a cross-sectional view of the fuel tank 1. FIG. 2 presents a II-II cross section illustrated in FIG. 1. An outline of the configuration of the fuel tank 1 is described below using FIGS. 1 and 2. In the following description, "fuel tank 1" indicates a composite unit including components described below. "Tank body 2" indicates a container itself.

The fuel tank 1 mounted in a passenger vehicle or the like to store fuel mainly includes the tank body 2 made of polyethylene, a protrusion 3 molded integrally with the tank body 2, a mouth member 7, a sealing member 9 (see FIG. 2), a lid member 10, various functional components accommodated in the tank body 2, and a bracket 6 accommodated in the tank body 2 to support part of the functional components. The protrusion 3 is formed into a tube, and communicates with the inside of the tank body 2. Of them, the protrusion 3, the mouth member 7, the lid member 10, and the sealing member 9 constitute a seal structure. Moreover, the tank body 2 is connected to, for example, an oil feed pipe 8 that feeds fuel from the outside to the fuel tank 1.

As illustrated in FIG. 2, the mouth member 7 is fixed to an inner peripheral surface of the protrusion 3. The mouth member 7 includes a cylindrical-(sleeve)-shaped first tubular portion 7a provided along the inner peripheral surface of the protrusion 3. An upper end of the first tubular portion 7a, together with an upper end of the protrusion 3, constitutes an opening end 4. Suppose the opening end 4, an inner peripheral surface, linked to the opening end 4, of the mouth member 7 (the first tubular portion 7a), and an outer peripheral surface of the protrusion 3 are defined all together as an opening portion 4a. The first tubular portion 7a is fixed to the inner peripheral surface of the protrusion 3. Accordingly, the first tubular portion 7a serves as an inner surface of the opening portion 4a, and the protrusion 3 serves as an outer surface of the opening portion 4a.

The lid member 10 is a member that blocks the opening portion 4a oil-tightly. The lid member 10 includes a cylindrical-shaped second tubular portion 10a, and a flange portion 10b. As described below, the second tubular portion 10a is inserted and fixed in the first tubular portion 7a of the mouth member 7. In other words, the mouth member 7 functions as a ring for mounting (fixing) the lid member 10.

The sealing member 9 is an O ring obtained by molding an elastic body such as rubber into a ring, and is attached to the outer surface of the protrusion 3. The second tubular portion 10a is inserted axially along the first tubular portion 7a. The sealing member 9 is then held between an inner peripheral surface of the flange portion 10b and the outer peripheral surface of the protrusion 3 to block the opening portion 4a oil-tightly. Accordingly, the fuel in the liquid state, or vaporized fuel, is prevented from leaking. The details of the seal structure are described later. Such a state where the opening portion 4a of the fuel tank 1 is blocked may be hereinafter simply referred to as the "state where the lid member 10 is mounted on the protrusion 3," and a process leading to this state as "when the lid member 10 is mounted on the protrusion 3" or the "process of mounting the lid member 10 on the protrusion 3."

A fuel pump unit 15 being one of the functional components is fixed to an undersurface of the lid member 10. The fuel pump unit 15 includes a fuel pump, a filter, and a pressure regulator (none of them are illustrated). The embodiment adopts what is called an in-tank module that mounts them all inside the tank body 2. The fuel pump unit 15 is connected to a fuel injector (not illustrated) via a pipe such as an external connecting pipe 15a that protrudes from the top of the lid member 10. Another member such as a fill-up regulating valve (not illustrated) may be included as the functional component fixed to the undersurface of the lid member 10.

Moreover, a biasing member 16 is provided to the undersurface of the lid member 10. The biasing member 16 is formed of, for example, a coil spring to bias the fuel pump unit 15 downward toward a bottom surface of the bracket 6 or the fuel tank 1. The biasing member 16 biases the fuel pump unit 15 downward. Accordingly, as a result, the lid member 10 is biased upward.

FIG. 3(a) is an upper perspective view of the mouth member 7. FIG. 3(b) is a lower perspective view of the lid member 10. FIG. 3(c) is a lower perspective view illustrating a state where the lid member 10 is in engagement with the mouth member 7. The illustration of the fuel pump unit 15 fixed to the lid member 10 is omitted in FIGS. 3(b) and 3(c) (and also in FIGS. 4 to 6, 9, and 11).

Firstly, the mouth member 7 is described. The mouth member 7 is made of a thermoplastic resin (here, polyacetal (POM)). As illustrated in FIG. 3(a), an outer surface of the cylindrical (sleeve)-shaped first tubular portion 7a is provided integrally with a pair of arm-shaped stays 7b and 7b respectively projecting leftward and rightward. In this manner, the mouth member 7 is made of resin to promote cost reduction and weight reduction.

Groove portions 7c (see FIG. 5(b)) whose cross-sectional shapes are a substantially trapezoid (inverted tapered shape) are extended on upper surfaces of the stays 7b and 7b in the front-and-back direction. Moreover, projections 7h with a predetermined thickness are extended circumferentially on an outer peripheral surface between the two stays 7b and 7b. The projections 7h are brought into intimate contact with an upper inner surface of the tank body 2 when the tank body 2 is molded (see FIG. 9(b)). The projections 7h prevent the mouth member 7, together with the lid member and the pump unit, from dropping off when an upward stress acts on the mouth member 7 (for example, when the lid member 10 is forcibly pulled out). Moreover, the projections 7h also have an operation of preventing a parison 20 from flowing out of an area sandwiched between a mold 21 and the mouth member 7 when the protrusion 3 is molded (see FIG. 7(b) and the like for them all).

A plurality of (here, six; only three of them are shown in FIG. 3(a)) engaging claws 7d projects circumferentially at a substantially vertical center portion on an inner peripheral surface of the first tubular portion 7a. The engaging claws 7d regulate upward displacement of the lid member 10 inserted in the mouth member 7 to prevent pullout.

Moreover, an acute portion 7f is extended circumferentially at an edge of the first tubular portion 7a on the opening end 4 (see FIG. 2) side where the protrusion 3 is open. An inclined surface 7e inclined radially from the acute portion 7f is formed in a predetermined area below the upper end of the first tubular portion 7a. The detailed configurations of the engaging claw 7d, the acute portion 7f, and the inclined surface 7e are described later.

Next, the lid member 10 is described. The lid member 10 is made of a thermoplastic resin (here, polyacetal). As illustrated in FIG. 3(b), the lid member 10 includes the substantially cylindrical-shaped second tubular portion 10a and the flange portion 10b. The flange portion 10b includes an upper surface portion 10e that covers (blocks) an upper end of the second tubular portion 10a, and projects radially outward. A plurality of (here, six) through holes penetrating the second tubular portion 10a is provided circumferentially at regular intervals at substantially the center of the second tubular portion 10a in the up-and-down direction. The through hole serves as an engaged portion 10c.

The flange portion 10b includes a cylindrical-shaped downward hanging portion 10d that hangs downward at an outer edge of the flange portion 10b. An inner diameter of the downward hanging portion 10d is assumed to be slightly larger than an outer diameter of a base 3c (see FIG. 5(b)) of the protrusion 3 (see FIG. 2). In the state where the lid member 10 is mounted on the protrusion 3, the flange portion 10b covers at least upper half of the protrusion 3 including the opening end 4 (see FIG. 2). The lid member 10 has a simple shape that includes the through holes (the engaged portions 10c) in the second tubular portion 10a, and includes the downward hanging portion 10d in the flange portion 10b. Thus, the lid member 10 can be formed by injection molding with a mold having a simple configuration. Accordingly, a reduction in production cost is promoted. R-chamfering and/or C-chamfering may be performed on a lower edge of an inner peripheral surface of the downward hanging portion 10d (see FIG. 5(b)).

As illustrated in FIG. 3(c), the second tubular portion 10a of the lid member 10 is inserted from above along the inner peripheral surface of the mouth member 7 (the first tubular portion 7a) fixed to the protrusion 3 (see FIG. 2). The engaging claw 7d and the engaged portion 10c are then engaged with each other in the insertion direction of the second tubular portion 10a. Accordingly, the lid member 10 is readily mounted on the protrusion 3. The detailed configuration related to the engagement is described later.

When the lid member 10 is mounted on the protrusion 3, positioning is performed circumferentially as described below. A mold for molding the lid member 10 is marked. A positioning marker 10h (see FIG. 1) is provided on an upper surface of the flange portion 10b of the lid member 10. On the other hand, the mouth member 7 is supported by the bracket 6 accommodated in the tank body 2 (see FIGS. 1 and 2 for them all). The mouth member 7, the bracket 6, and the tank body 2 (the protrusion 3) are positioned upon blow molding. Therefore, a mold for molding the tank body 2 is marked to form a reference marker 2a (see FIG. 1) on the tank body 2. When the lid member 10 is attached to the protrusion 3, the positioning marker 10h is aligned with the reference marker 2a provided to the tank body 2. Accordingly, the circumferential positions of the engaged portions 10c and the engaging claws 7d can be adjusted.

Figure 4:
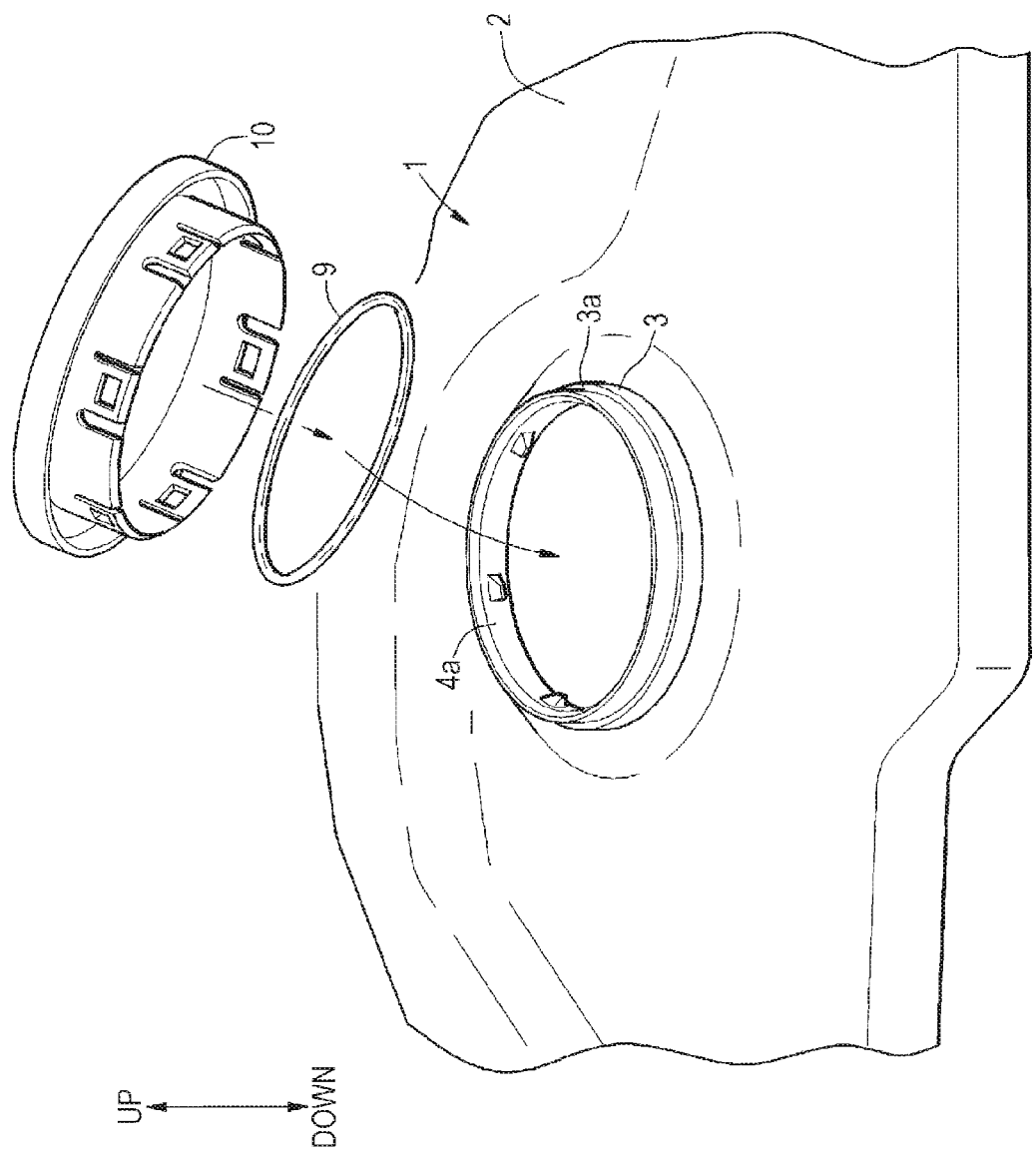
FIG. 4 is a perspective view illustrating a peripheral configuration of a protrusion to which the mouth member is fixed.
Figure 5:
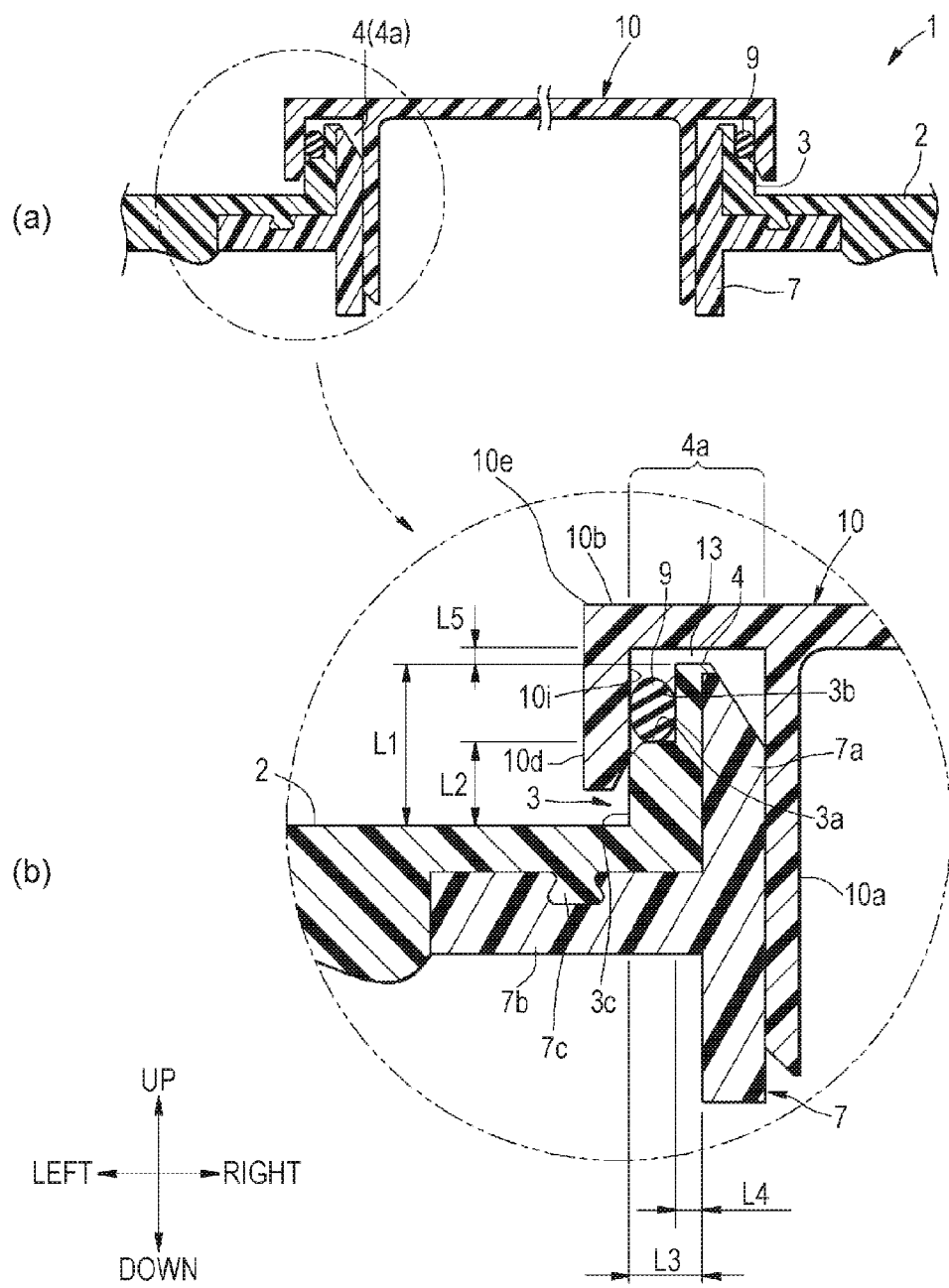
FIG. 5(a) is a cross-sectional view illustrating a seal structure where the lid member is mounted on the protrusion of the fuel tank.
FIG. 5(b) is a main part enlarged view of FIG. 5(a).

FIG. 4 is a perspective view illustrating a peripheral configuration of the protrusion 3 to which the mouth member 7 is fixed. FIG. 5(a) is a cross-sectional view illustrating the seal structure where the lid member 10 is mounted on the protrusion 3 of the fuel tank 1, and FIG. 5(b) is a main part enlarged view of FIG. 5(a). FIG. 5(a) corresponds to an enlarged periphery of the opening portion 4a of FIG. 2.

As illustrated in FIG. 4, a ring-shaped shoulder surface (hereinafter referred to as the "ring-shaped shoulder surface 3a") is provided all around the outer peripheral surface of the protrusion 3 at a middle position of the protrusion 3 in the up-and-down direction. The protrusion 3 is formed with a radially thin wall above the ring-shaped shoulder surface 3a and with a relatively thick wall below the ring-shaped shoulder surface 3a. The sealing member 9 is attached to the outer peripheral surface of the protrusion 3 in a state of being supported by the ring-shaped shoulder surface 3a from below. In this manner, the ring-shaped shoulder surface 3a functions as a supporting surface of the sealing member 9.

The sealing member 9 made of an elastic body deforms easily. Accordingly, in the production process of the fuel tank 1, the worker simply expands the diameter of the ring-shaped sealing member 9 and places it on the ring-shaped shoulder surface 3a formed on the protrusion 3 to complete the attachment of the sealing member 9. In this manner, the attachment of the sealing member 9 is very easy. Consequently, the production lead time is reduced. Moreover, the ring-shaped shoulder surface 3a is provided all around the outer peripheral surface of the protrusion 3. Therefore, downward displacement of part of the sealing member 9 and/or deformation of the sealing member 9 at the time when the lid member 10 is mounted on the protrusion 3 is reliably prevented. Accordingly, reliable sealing performance can be exhibited.

As illustrated in FIGS. 5(a) and 5(b), the protrusion 3 is provided in intimate contact with an outer peripheral surface of the mouth member 7 at the opening portion 4a. The protrusion 3 protrudes L1=approximately 12 mm from an upper surface of the tank body 2. The ring-shaped shoulder surface 3a is provided at a height of L2=approximately 6 mm from the upper surface of the tank body 2. The radial thickness of the protrusion 3 is set to L3=approximately 4 mm axially below the ring-shaped shoulder surface 3a (that is, on the tank body 2 side), and is set to L4=approximately 2 mm above the ring-shaped shoulder surface 3a (that is, the opening end 4 side). The ring-shaped shoulder surface 3a has a width of approximately 2 mm resulted from a subtraction (L3−L4).

The ring-shaped shoulder surface 3a regulates downward movement of the sealing member 9. Therefore, the sealing member 9 is prevented from being detached from the protrusion 3 when the lid member 10 is mounted on the protrusion 3. Conversely, when the lid member 10 is removed from the protrusion 3, the sealing member 9 is attached onto the outer peripheral surface of the protrusion 3 due to its own elasticity. Accordingly, the sealing member 9 is prevented from being easily removed. Even if the sealing member 9 is detached, the sealing member 9 can be readily mounted again.

In a state where an external force does not act, the cross section of the sealing member 9 has a circular shape (here, its diameter is approximately 3.5 mm). In the state where the lid member 10 is mounted on the protrusion 3, the sealing member 9 supported by the ring-shaped shoulder surface 3a is held, above the ring-shaped shoulder surface 3a as the supporting surface, between the outer peripheral surface (hereinafter referred to as the "first sealing surface 3b") of the protrusion 3, and the inner peripheral surface (hereinafter referred to as the "second sealing surface 10i") of the downward hanging portion 10d that hangs downward from the flange portion 10b of the lid member 10. The sealing member 9 then deforms in such a manner as to be crushed radially (here, in the left-and-right direction) from both sides. In the state where the lid member 10 is mounted on the protrusion 3, the first sealing surface 3b, the second sealing surface 10i, and the ring-shaped shoulder surface 3a as a whole form a ring-shaped groove, in which the sealing member 9 is accommodated.

In this manner, in the embodiment, the sealing member 9 comes into intimate contact with the first sealing surface 3b of the protrusion 3 and the second sealing surface 10i of the lid member 10 (the downward hanging portion 10d). Accordingly, an axial seal structure is realized. The protrusion 3 of the fuel tank 1 is reliably sealed by the lid member 10. Moreover, since it is the axial seal structure, only the outer dimension of the first sealing surface 3b and the inner diameter dimension of the second sealing surface 10i are required to be controlled to guarantee the sealing performance. Accordingly, the production process is simplified.

Moreover, in the state where the lid member 10 is mounted on the protrusion 3, a small gap is actually formed, considering a radial dimension tolerance, between the second sealing surface 10i of the lid member 10 and the outer peripheral surface (the surface formed below the ring-shaped shoulder surface 3a) of the protrusion 3 near the base 3c of the protrusion 3. However, the gap is minute. Consequently, the ring-shaped shoulder surface 3a and the sealing member 9 are concealed by the downward hanging portion 10d from the outside. Thus, it is prevented that the sealing member 9 protrudes toward the base 3c and that foreign substances such as dust enter the sealing surface.

Here, the first sealing surface 3b of the protrusion 3, with which the sealing member 9 comes into intimate contact, is supported by the first tubular portion 7a of the mouth member 7 from the inner diameter side. The hardness of polyacetal of which the mouth member 7 is made is relatively high. Consequently, the substantial strength of the protrusion 3 on the first sealing surface 3b is ensured. Especially, at the thin portion above the ring-shaped shoulder surface 3a, creep deformation (settling of resin) where the resin deforms permanently due to a reaction force of the sealing member 9 can be suppressed.

On the other hand, the downward hanging portion 10d and the upper surface portion 10e of the lid member 10, with which the sealing member 9 comes into intimate contact, require the strength that does not allow the deformation thereof even due to radially outward stress received via the sealing member 9. However, the downward hanging portion 10d and the upper surface portion 10e are both portions, which are exposed to the outside, of the fuel tank 1. Their thicknesses are not especially limited. Therefore, the downward hanging portion 10d and the upper surface portion 10e are designed to have thicknesses that do not deform under the stress received via the sealing member 9. Accordingly, sufficient sealing performance is ensured. Moreover, a plurality of ribs (not illustrated) may be provided radially in top view to the lid member 10 from the downward hanging portion 10d to the upper surface portion 10e to ensure the strength of the lid member 10. Providing such ribs makes it easy for the worker to hold the lid member 10, and also improves workability.

Moreover, as illustrated, in the state where the lid member 10 is mounted on the protrusion 3, a gap 13 is formed between the upper end of the protrusion 3 and the flange portion 10b. Here, the gap 13 is assumed to have a spacing of L5=approximately 1.0 mm. As described above, the functional member (here, the fuel pump unit 15) fixed to the lid member 10 is biased upward by the biasing member 16 (see FIG. 2 for them all). The lid member 10 is also biased upward via the functional member. On the other hand, upward displacement of the lid member 10 is regulated by the engaging claws 7d (see FIGS. 3(a) and 3(c)) formed on the mouth member 7. The width of the engaged portion 10c (see FIGS. 3(b) and 3(c)) in the up-and-down direction is controlled to enable the adjustment of the size of the gap 13.

In this configuration, if the lid member 10 is pressed further downward in the state where the lid member 10 is mounted on the protrusion 3 (that is, the state illustrated in FIG. 5(b)), the lid member 10 can be displaced downward until the gap 13 is eliminated (that is, until the lid member 10 comes into contact with the opening end 4). Therefore, the opening end 4 regulates the downward displacement of the lid member 10. In other words, in the seal structure according to the embodiment, the lid member 10 is given play with a length of the gap 13 in the up-and-down direction in the state where the lid member 10 is mounted on the protrusion 3. As a result, when the tank body 2 and the protrusion 3 are molded, the need is eliminated of strictly controlling the dimension (height) of the opening end 4 in the up-and-down direction.

Moreover, a screw portion or the like is not formed on the protrusion 3. Accordingly, the thickness of the protrusion 3 can be made thin. Thus, the weight reduction of the fuel tank 1 is promoted. Moreover, the fit length with the lid member 10 can be made short. Accordingly, the protruding height of the protrusion 3 is kept to a minimum. Making effective use of space and ensuring the capacity of the fuel tank 1 upon the mounting of the fuel tank 1 in a vehicle is promoted.

In the embodiment, as described above, the tank body 2 and the protrusion 3 are made of high-density polyethylene. On the one hand, the mouth member 7 and the lid member 10 are made of polyacetal. High-density polyethylene indicates a polyethylene with a density of equal to or more than 0.942. As is known, high-density polyethylene has a large change in swelling due to fuel (gasoline) as compared with polyacetal. Accordingly, the diameter of the opening portion 4a is to expand as the tank body 2 swells. On the other hand, the mouth member 7 and the lid member 10 are relatively less likely to swell. Therefore, a radial force that forms a gap acts between the mouth member 7 and the protrusion 3. However, at this point in time, the expansion of the diameter of the protrusion 3 is regulated by the downward hanging portion 10d. This makes the interference of the sealing member 9 small. Accordingly, the protrusion 3 slightly deforms radially inward due to the reaction force. The expansion of the diameter of the protrusion 3 is then offset. In other words, in the embodiment, the mouth member 7 and the lid member 10 are made of the same material with a small swelling ratio for the fuel, and the protrusion 3 made of a material with a large swelling ratio is placed radially between the mouth member 7 and the lid member 10. Accordingly, the aged deterioration of the sealing performance is reduced.

Moreover, let the coefficient of linear expansion of high-density polyethylene be $\alpha p$, and let the coefficient of linear expansion of polyacetal be $\alpha a$.

$\alpha p = 12$ to $14 \times 10-5/°$ C.

$\alpha a = 8.1$ to $8.5 \times 10-5/°$ C.

Their coefficients of linear expansion are close. Therefore, even if the temperature of an environment where the fuel tank 1 is placed changes, the mouth member 7 and the protrusion 3, which are in radial intimate contact with each other at the opening portion 4a, are not separated. Moreover, the mouth member 7 and the lid member 10 are made of the same material. Thus, there is no need to consider the difference in coefficient of linear expansion. Even if the environment temperature changes, the distance between the first sealing surface 3b of the protrusion 3 that is supported by the mouth member 7 from the inside, and the second sealing surface 10i of the lid member 10 does not change substantially. Excellent sealing performance is always ensured.

FIG. 6(a) is a main part enlarged view illustrating a first modification of the seal structure. FIG. 6(b) is a main part enlarged view illustrating a second modification of the seal structure. In the first modification, an outer surface of the tank body 2 is directly used as the supporting surface that supports the sealing member 9. In the first modification, it is preferable to make a gap formed between a lower end of the downward hanging portion 10d and the tank body 2 small in order to hold the sealing member 9 reliably between the first sealing surface 3b and the second sealing surface 10i.

In the second modification, a ring-shaped seal supporting member 9a is fit onto the protrusion 3 to use an upper surface of the seal supporting member 9a as the supporting surface. Also in the second modification, the first sealing surface 3b, the second sealing surface 10i, and the upper surface of the seal supporting member 9a as a whole form a ring-shaped groove, in which the sealing member 9 is accommodated.

Figure 7:
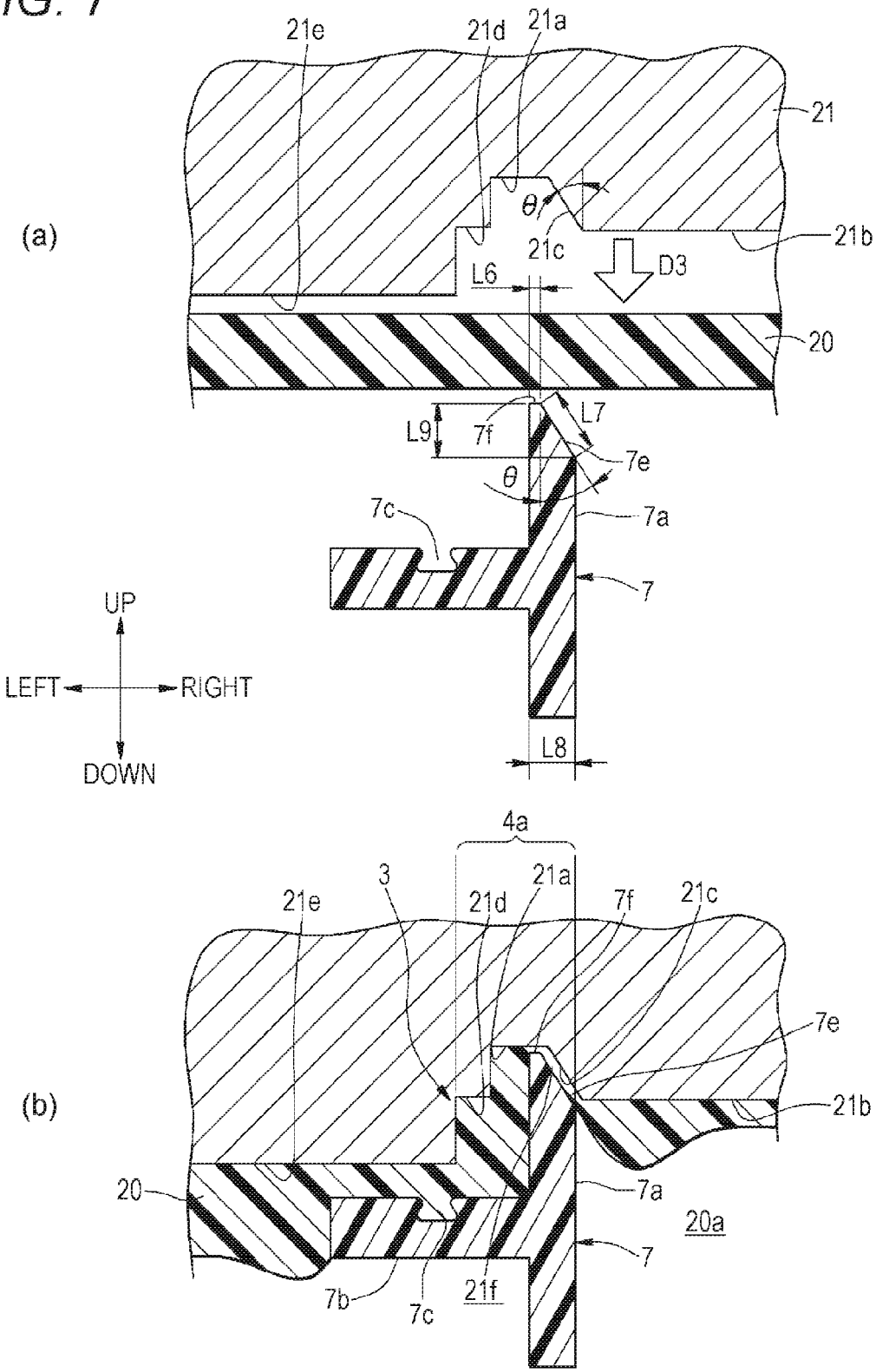
FIGS. 7(a) and 7(b) are explanatory views explaining a production process of the fuel tank.

FIGS. 7(a) and 7(b) are explanatory views explaining the production process of the fuel tank 1. FIGS. 8(a) to 8(c) are explanatory views illustrating positions to cut away the parison 20 in the production process of the fuel tank 1. The production process of the fuel tank 1 according to the embodiment, especially the step of forming the opening portion 4a (see FIG. 2) of the fuel tank 1, is described in detail below using FIGS. 7 and 8.

The fuel tank 1 (the tank body 2 and the protrusion 3) is molded using the known blow molding technique. In other words, high-density polyethylene being a resin material of which the tank body 2 and the protrusion 3 are made is melt into a pipe to form the parison 20. The parison 20 is held by the mold 21 for molding. Air is blown into the parison 20 to form the fuel tank 1. Prior to blow molding, the bracket 6 (see FIG. 2) is placed inside the pipe-shaped parison 20. The parison 20 is normally extruded downward from above to maintain the pipe shape. In FIG. 7, the state where the orientation has been rotated 90 degrees is depicted (in the description, pursuant to the illustrated directions). Moreover, as described above, the mouth member 7 is supported from below by the bracket 6 or a jig. The illustration is omitted in FIG. 7.

In the production process of the fuel tank 1, firstly, the parison 20 is placed between the mold 21 and the mouth member 7 as illustrated in FIG. 7(a). Here, the mold 21 includes a mold base surface 21a and a mold protrusion 21b protruding downward from the mold base surface 21a. A mold inclined surface 21c is formed around an outer periphery of the mold protrusion 21b. Furthermore, on the mold 21, a mold shoulder surface 21d is formed at a downwardly lower level than the mold base surface 21a, and a tank opposing surface 21e is formed at yet another lower level than the mold shoulder surface 21d.

On the other hand, as described above, the acute portion 7f and the inclined surface 7e are extended circumferentially at the upper end of the mouth member 7 placed opposed to the mold 21. The inclined surface 7e is formed into a tapered shape that is progressively increased in inner diameter of the mouth member 7 (the first tubular portion 7a) toward the opening end 4 (see FIG. 5(b)). Such a shape facilitates the entrance of the mold protrusion 21b into the mouth member 7 along the tapered shape, and further leads to the centering of the mold protrusion 21b, when the mold 21 is pressed against the mouth member 7. Here, the thickness of the mouth member 7 at the acute portion 7f is set to be L6=approximately 1 mm. The thickness of the first tubular portion 7a excluding the acute portion 7f and the inclined surface 7e is set to be L8=approximately 4 mm. In other words, the acute portion 7f is formed not as a line but as a surface having some width. Moreover, the angle of inclination of the mold inclined surface 21c and the angle of inclination of the inclined surface 7e of the mouth member 7 with respect to the up-and-down direction are set to be substantially the same ($\theta$).

The inclination angle $\theta$ is not particularly limited. However, as described below, workability at the time of post-processing (removing the parison 20) depends on a width (L7) of the inclined surface 7e of the mouth member 7. Therefore, it is preferable to secure L7=approximately 5 to 10 mm from an inner edge of the acute portion 7f, for the width (L7) of the inclined surface 7e. Here, the thickness of the first tubular portion 7a of the mouth member 7 (excluding the part of the acute portion 7f and the inclined surface 7e) is L8=approximately 4 mm. The thickness of the acute portion 7f is L6=1 mm. Accordingly, when the width of the inclined surface 7e is set to L7=5 mm, the inclination angle $\theta$ is as follows:

$$\theta = \sin^{-1}((L8-L6)/L7) \quad \text{(equation 1)}$$
$$= \sin^{-1}(3/5) = 36.9 \text{ (deg)}$$

When L7=10 mm, the inclination angle $\theta$ is as follows:

$$=\sin^{-1}(3/10)=17.5 \text{ (deg)}$$

In other words, the inclination angle $\theta$ is required to be set to $\theta$=17.5 to 36.9 (deg).

Here, let an area occupied axially by the inclined surface 7e be L9. L9 is as follows:

$$L9=L7\times\cos(\theta) \quad \text{(equation 2)}$$

In other words, when the width of the inclined surface 7e is set to L7=5 mm, and the inclination angle $\theta$=17.5 (deg), L9=5×cos (17.5 (deg))=4.7 mm. When the width of the inclined surface 7e is set to L7=10 mm, and the inclination angle $\theta$=17.5 (deg), likewise L9=9.5 mm. When the width of the inclined surface 7e is set to L7=5 mm, and the inclination angle $\theta$=36.9 (deg), L9=4.0 mm. When the width of the inclined surface 7e is set to L7=10 mm, and the inclination angle $\theta$=36.9 (deg), L9=8.0 mm. In this manner, the inclined surface 7e occupies an area of 4 mm to 9.5 mm below the distal end of the acute portion 7f.

In the embodiment, the mouth member 7 is provided for positioning relative to the mold 21 when the fuel tank 1 is molded. When the mold 21 is pressed against the mouth member 7 across the parison 20 in a direction D3, the mold protrusion 21b is guided by the first tubular portion 7a of the mouth member 7, or more specifically, the inclined surface 7e, as illustrated in FIG. 7(b). As a result, the mold 21 and the mouth member 7 are centered (positioned). As described above, the inclined surface 7e is provided axially over the predetermined area (4 mm to 9.5 mm). With the guide length of this degree, the mouth member 7 and the mold protrusion 21b are smoothly centered. Prior to molding, a release agent may be applied to the inner peripheral surface of the first tubular portion 7a excluding the acute portion 7f and the inclined surface 7e. Consequently, the parison 20 is prevented from adhering to the inner peripheral surface of the mouth member 7.

In the area where positioning has been performed, the parison 20 sandwiched (filled) between the mold 21 and the mouth member 7 forms the protrusion 3. Furthermore, part of the melted parison 20 enters the groove portions 7c of the inverted tapered shape of the stays 7b provided on the side surface of the mouth member 7. The parison 20 is filled in the groove portions 7c and accordingly the mouth member 7 is firmly fixed to the tank body 2 via the stays 7b. The thickness of the stay 7b in the up-and-down direction is required to be approximately 4 to 5 mm. When the depth of the groove portion 7c is set to approximately 2 to 3 mm from the upper surface of the stay 7b, the strength itself of and the mounting strength to the tank body 2 of the stay 7b can be made sufficient.

Here, a stroke upon pressing the mold 21 against the parison 20 is adjusted. Accordingly, the mold base surface 21a is brought into contact with the acute portion 7f of the mouth member 7 to enable the acute portion 7f to pinch off the parison 20. Moreover, the adjustment of the stroke can make the thickness of the parison 20 sandwiched between the mold base surface 21a and the acute portion 7f, and between the mold inclined surface 21c and the inclined surface 7e of the mouth member 7, which are made substantially parallel, (hereinafter referred to as the "molding gap 21f") as thin as 1 mm or less (preferably, 0.5 mm or less).

The thickness of the resin remaining in the molding gap 21f immediately after molding, that is, the thickness of the protrusion 3 on the acute portion 7f or the inclined surface 7e, becomes thinner than the other part of the fuel tank 1 (specifically, the tank body 2 has a thickness of approximately 6 mm, and the protrusion 3 is, as described above, set to L4=approximately 2 mm (see FIG. 5(b)) above the ring-shaped shoulder surface 3a). In the embodiment, the acute portion 7f is formed as a surface having some width. However, substantially, the acute portion 7f and the inclined surface 7e form a knife edge extending circumferentially. Parts, which correspond to the molding gap 21f, of the acute portion 7f and the inclined surface 7c are made thin to the degree that the parison 20 is pinched off, or readily cut away in the process of molding the tank body 2.

Moreover, in blow molding, the mold 21 comes into contact with an outer surface of a molded part. Therefore, dimension accuracy can be dramatically increased on the outer surfaces of the tank body 2 and the protrusion 3 as compared with their inner sides. In addition, upon molding, the mold 21 is centered by the mouth member 7. Thus, it becomes possible to highly accurately control the outer shape of the protrusion 3, in other words, the thickness of the protrusion 3 above the ring-shaped shoulder surface 3a (that is, the thickness of the first sealing surface 3b; L4 illustrated in FIG. 5(b)=2 mm), the thickness of the protrusion 3 below the ring-shaped shoulder surface 3a (L3 illustrated in FIG. 5(b)=4 mm), and the width of the ring-shaped shoulder surface 3a (L3−L4 in the same figure=2 mm). Consequently, the coaxiality of the first sealing surface 3b formed above the ring-shaped shoulder surface 3a, and the mouth member 7 (the first tubular portion 7a) are adjusted with high accuracy to enable the presence of reliable sealing performance.

The mold 21 is separated from the state illustrated in FIG. 7(b) to obtain the protrusion 3 to which the mouth member 7 is fixed, and the tank body 2. However, the parison 20 still remains at the opening portion 4a of the protrusion 3 immediately after the separation of the mold 21. Therefore, the step of removing the parison 20 that covers the opening portion 4a (the parison removal step) is provided. As described above, the parison 20 is thinned to 1 mm or less in the molding gap 21f. The thinned portion is cut. Accordingly, the resin remaining inward of the opening portion 4a (the opening end 4) can be readily removed. Here, the Rockwell hardness of high-density polyethylene of which the tank body 2 is made is D60 to D70. The tank body 2 is made of a material having lower hardness than polyacetal (the Rockwell hardness is R120) of which the mouth member 7 is made. The above-mentioned prior art requires a large-scale apparatus such as a cutting apparatus to form an opening in the tank body 2. However, in the embodiment, the worker can readily remove the excess parison 20 with a general-purpose tool such as a box cutter.

In the parison removal step for the opening portion 4a, the parison 20 may be cut at the acute portion 7f as illustrated in FIG. 8(a), may be cut at the boundary between the acute portion 7f and the inclined surface 7e as illustrated in FIG. 8(b), and may be cut at the inclined surface 7e as illustrated in FIG. 8(c). Moreover, the aspects of FIGS. 8(a) to 8(c) may be mixed in the circumferential direction of the opening portion 4a. In other words, in the embodiment, the protrusion 3 covers part of the acute portion 7f, or the acute portion 7f and part of the inclined surface 7e at the opening portion 4a of the tank body 2 where the mouth member 7 is mounted, after the parison 20 has been removed. The radially inward edge of the protrusion 3 is located on the acute portion 7f or the inclined surface 7e.

Consequently, the surface of the mouth member 7 is protected on the opening end 4 side. This prevents situations such that the mouth member 7 is damaged, for example, when the lid member 10 is mounted on the protrusion 3. In the parison removal step, it does not matter that some burr protrudes upward as a result of removing the parison 20. As described above, the gap 13 of L5=approximately 1 mm is provided between the opening end 4 and the undersurface of the lid member 10 (see FIG. 5(b) for them all). Thus, the protruding burr does not at all influence the mounting of the lid member 10 as long as it is within the gap 13.

In this manner, the production method of the fuel tank 1 according to the embodiment includes the step of interposing the parison 20 between the mold 21 used for molding the tank body 2 and the protrusion 3, and the mouth member 7, the step of positioning the mold 21 and the mouth member 7 by use of the inclined surface 7e provided to the mouth member 7, holding the parison 20 in the area where the positioning was performed, and forming the protrusion 3, the step of performing blow molding, and the step of cutting the parison 20 from the molded fuel tank 1 (the tank body 2 and the protrusion 3) by the acute portion 7f or the inclined surface 7e of the mouth member 7.

Figure 9:
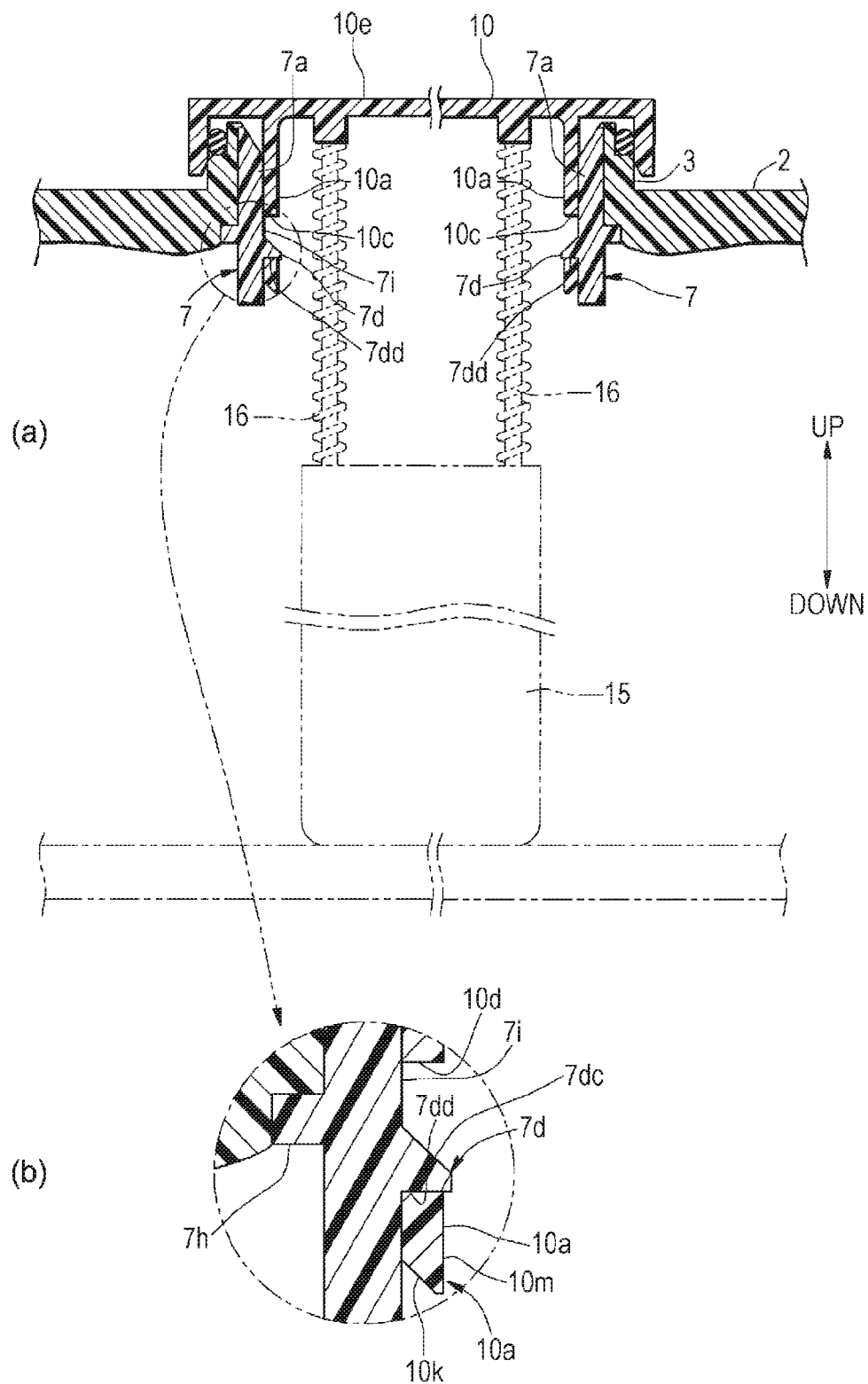
FIG. 9(a) is a cross-sectional view illustrating a state where the lid member is mounted on the protrusion.
FIG. 9(b) is a main part cross-sectional view illustrating an engaged part between an engaging claw and an engaged portion.

FIG. 9(a) is a cross-sectional view illustrating the state where the lid member 10 is mounted on the protrusion 3. FIG. 9(b) is a main part cross-sectional view illustrating the engaged part between the engaging claw 7d and the engaged portion 10c. FIG. 10(a) is an explanatory view illustrating the engaging claw 7d provided to the inner peripheral surface of the mouth member 7. FIG. 10(b) is an explanatory view illustrating the state where the mouth member 7 is in engagement with the lid member 10. FIG. 10(c) is an explanatory view illustrating a state where the engagement between the member 7 and the lid member 10 has been released. FIG. 9 illustrates the IX-IX cross section in FIG. 1.

Figure 3:
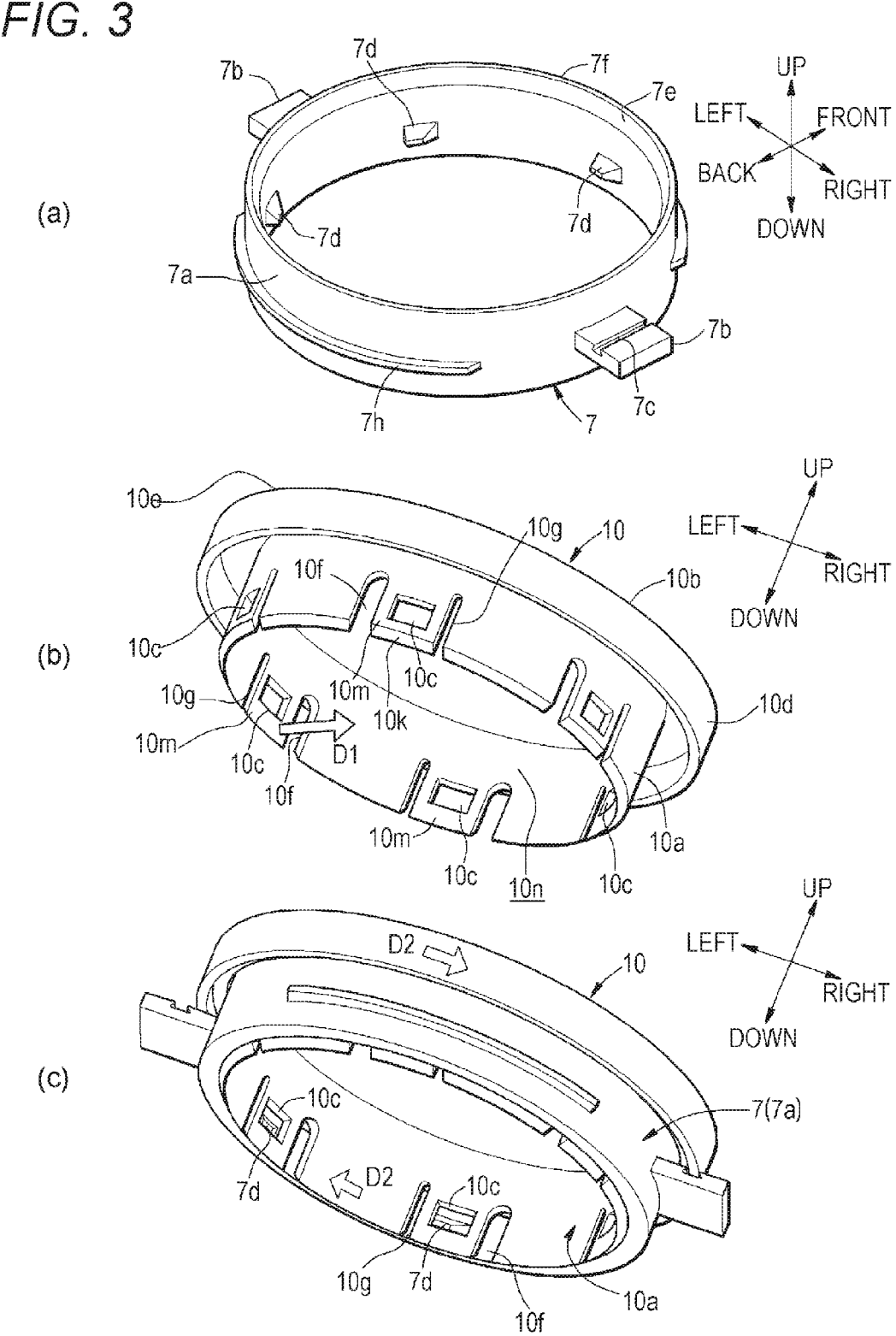
FIG. 3(a) is an upper perspective view of a mouth member.
FIG. 3(b) is a lower perspective view of a lid member.
FIG. 3(c) is a lower perspective view illustrating a state where the lid member is in engagement with the mouth member.
Figure 10:
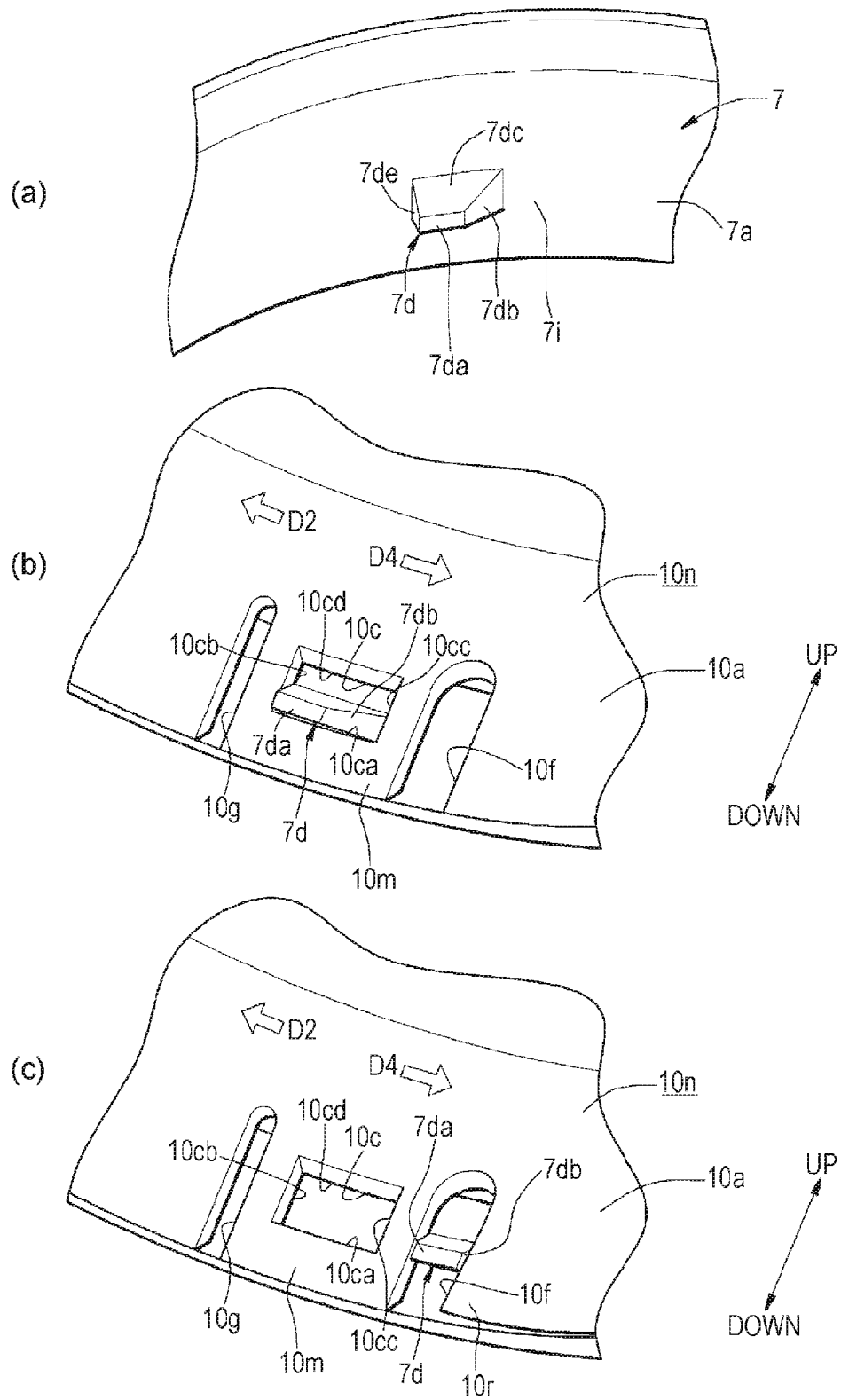
FIG. 10(a) is an explanatory view illustrating the engaging claw provided to an inner peripheral surface of the mouth member.
FIG. 10(b) is an explanatory view illustrating the state where the mouth member is in engagement with the lid member.
FIG. 10(c) is an explanatory view illustrating the state where the engagement between the member and the lid member has been released.

The configurations of the engaging claw 7d and the engaged portion 10c, the process of mounting the lid member 10 on the protrusion 3, and the process of removing the lid member 10 from the protrusion 3 are described below, using FIGS. 9 and 10 in combination with FIGS. 2 and 3. In the process of mounting the lid member 10 on the protrusion 3, as described above, the reference marker 2a formed on the tank body 2 is assumed to be aligned with the positioning marker 10h formed on the lid member 10 (see FIG. 1 for them all) to position the lid member 10 and the mouth member 7 circumferentially.

As illustrated in FIGS. 9(a) and 9(b), and FIG. 10(a), the plurality of engaging claws 7d protruding toward the second tubular portion 10a of the lid member 10 is provided circumferentially to an inner peripheral surface 7i of the first tubular portion 7a of the mouth member 7. An undersurface of the engaging claw 7d forms a parallel surface 7dd parallel to the radially inward direction of the first tubular portion 7a. A second inclined surface 7dc is formed on a surface opposite to the parallel surface 7dd, that is, an upper surface of the engaging claw 7d. The thickness between the second inclined surface 7dc and the parallel surface 7dd is gradually reduced toward the direction where the engaging claw 7d protrudes (here, the radially inward direction) (the inner diameter is progressively reduced toward the downward direction). In other words, the engaging claw 7d has a wedge shape that is tapered toward the radially inward direction in cross-sectional view.

As illustrated in FIG. 10(b) or FIG. 3(b), the lid member 10 is provided circumferentially with a first notch portion 10f and a second notch portion 10g extended from a lower edge (distal end) of the second tubular portion 10a to the axial center. A moving piece 10m is defined sandwiched between the notch portions. A plurality of the first notch portions 10f and a plurality of the second notch portions 10g are provided circumferentially. On the other hand, the notches do not extend upward from the axial center of the second tubular portion 10a. This area forms a flat circumferential surface area 10n. When the second tubular portion 10a is inserted into the first tubular portion 7a, the axial misalignment of them can be prevented by providing the circumferential surface area 10n. Moreover, the notch portions are provided on both of the open ends of the moving piece 10m. Accordingly, the open ends of the moving piece 10m can be displaced radially (see a direction D1 of FIG. 3(b)) with respect to the circumferential surface area 10n. The engaged portion 10c is formed in such a manner as to penetrate the moving piece 10m from the front through the back.

Moreover, as the shape is illustrated in detail in FIG. 9(b), a lower end inclined surface 10k that is progressively reduced in outer diameter (that is, becomes thinner) toward the downward direction is formed at a lower end of the second tubular portion 10a. The lower end inclined surface 10k is also formed at a lower end of the moving piece 10m.

When the second tubular portion 10a of the lid member 10 is inserted into the first tubular portion 7a of the mouth member 7, firstly, the lower end of the moving piece 10m of the second tubular portion 10a comes into contact with the engaging claw 7d projecting from the inner peripheral surface of the first tubular portion 7a. The lower end inclined surface 10k of the moving piece 10m, which is in contact with the upper surface (the second inclined surface 7dc) of the engaging claw 7d, receives a radially inward force along the second inclined surface 7dc. The entire moving piece 10m deforms elastically and radially inward (see the direction D1 of FIG. 3(b)). In other words, while the moving piece 10m is pressed radially inward by the engaging claw 7d, the lid member 10 is pressed into the mouth member 7.

When the lid member 10 is further pressed in, the engaged portion 10c of the lid member 10 eventually reaches a position facing the engaging claw 7d. At this point in time, the engaging claw 7d enters the engaged portion 10c being a through hole (the position where the engaged portion 10c faces the engaging claw 7d is hereinafter referred to as the "engagement position"). Concurrently with the entrance of the engaging claw 7d into the engaged portion 10c, the moving piece 10m is displaced rapidly and radially outward due to its own elastic force to collide with the first tubular portion 7a of the mouth member 7. The contact sound at this point causes the worker to recognize that the lid member 10 and the mouth member 7 have been engaged with each other. In this manner, in the embodiment, the lid member 10 is engaged with the mouth member 7 by what is called snap-fit that uses the elasticity of a material to press in.

The circumferential width of the opening of the engaged portion 10c is made larger than the length of the engaging claw 7d. Accordingly, the circumferential positioning accuracy of the lid member 10 and the mouth member 7 is relaxed. The worker can mount the lid member 10 on the protrusion 3 simply by referring to the above-mentioned reference marker 2a and positioning marker 10h (see FIG. 1 for both of them) and pressing the lid member 10 axially in the mouth member 7 (in other words, without rotating the lid member 10).

As described above, the lid member 10 to which the fuel pump unit 15 is fixed is biased upward by the biasing member 16 in the state where the lid member 10 is mounted on the protrusion 3. Accordingly, the engaged portion 10c of the lid member 10 comes axially into contact with the parallel surface 7dd formed on the undersurface of the engaging claw 7d to prevent pullout. Consequently, the lid member 10 is fixed to the protrusion 3 of the fuel tank 1 securely (that is, in a play-free manner).

Moreover, as illustrated in FIG. 10(a), the engaging claw 7d includes a first inclined surface 7db. The first inclined surface 7db is inclined circumferentially (reduced gradually and circumferentially in protruding height) from a protrusion end 7da projecting from the inner peripheral surface 7i of the first tubular portion 7a toward the inner peripheral surface 7i of the first tubular portion 7a. Moreover, a circumferentially opposite side to the first inclined surface 7db across the protrusion end 7da includes a vertical surface 7de formed substantially vertically to both the inner peripheral surface 7i and the parallel surface 7dd (see FIG. 9(b)).

As illustrated in FIG. 10(b), the protrusion end 7da, the first inclined surface 7db, and the vertical surface 7de are in the engaged portion 10c formed in the moving piece 10m of the lid member 10 in the state where the lid member 10 is mounted on the protrusion 3 (see FIG. 9(a)).

Here, among the edges of the engaged portion 10c configured as a through hole (opening), a first opening edge 10ca facing the parallel surface 7dd (see FIG. 9(b)) of the first tubular portion 7a, and a second opening edge 10cb facing the vertical surface 7de are surfaces orthogonal in the thickness direction to the principal surface of the moving piece 10m. The first opening edge 10ca comes into surface contact with the parallel surface 7dd. The second opening edge 10cb comes into surface contact with the vertical surface 7de. Therefore, when the lid member 10 is attempted to be rotated in a direction D4, the second opening edge 10cb of the engaged portion 10c is locked by the vertical surface 7de of the engaging claw 7d to regulate the rotation of the lid member 10. Moreover, when the lid member 10 is removed axially upward, the first opening edge 10ca of the engaged portion 10c is locked by the parallel surface 7dd of the engaging claw 7d to regulate the removal of the lid member 10.

The angles of inclination of a third opening edge 10cc facing the first inclined surface 7db of the engaging claw 7d, and a fourth opening edge 10cd facing the second inclined surface 7dc with respect to the principal surface of the moving piece 10m are not particularly limited. However, the third opening edge 10cc may be configured of such an inclined surface as to expand the opening in the radially outward direction of the lid member 10. If the third opening edge 10cc is configured of the inclined surface, the first inclined surface 7db of the engaging claw 7d, which faces the third opening edge 10cc, may be a vertical surface similar to the vertical surface 7de. In other words, the circumferentially inclined surface (here, the first inclined surface 7db) may be provided on either side, the engaging claw 7d or the engaged portion 10c. However, if the inclined surface is provided to the engaged portion 10c, the length, which protrudes radially inward, of the engaging claw 7d needs to be shorter than the thickness of the moving piece 10m.

As illustrated, the first notch portion 10f and the second notch portion 10g, which define the moving piece 10m, are different in circumferential notch width. In other words, the first notch portion 10f formed close to the first inclined surface 7db has a larger circumferential notch width than the second notch portion 10g formed close to the vertical surface 7de. Moreover, the notch width of the first notch portion 10f is made larger than the circumferential width of the protrusion end 7da. The notch width of the second notch portion 10g is made smaller than the circumferential width of the protrusion end 7da.

The process of removing the lid member 10 from the protrusion 3 is described below using FIGS. 10(b) and 10(c). When the worker rotates the lid member in a direction D2 from the state where the lid member 10 is mounted on the protrusion 3 (that is, the state illustrated in FIG. 10(b)), the moving piece 10m of the lid member 10 is gradually mounted onto the first inclined surface 7db formed on the engaging claw 7d to be displaced radially inward (the direction D1 (see FIG. 3(b)). In this manner, the engaged portion 10c is separated from the engaging claw 7d. When the lid member 10 is further rotated in the direction D2, the protrusion end 7da of the engaging claw 7d reaches a position facing the first notch portion 10f as illustrated in FIG. 10(c). When the vertical surface 7de of the engaging claw 7d has reached the first notch portion 10f, the moving piece 10m is displaced radially outward by its own elastic force. Also at this point in time, the contact sound occurs, and then the worker can recognize that the protrusion end 7da has entered the first notch portion 10f.

The engaging claw 7d faces the first notch portion 10f in the state illustrated in FIG. 10(c). The cutout of the first notch portion 10f is directed downward. Therefore, the engagement is released so that the lid member 10 can be removed upward (the position where the first notch portion 10f faces the protrusion end 7da of the engaging claw 7d is hereinafter referred to as the "removal position".). Here, the first notch portion 10f functions as a guide upon the removal of the lid member 10. Even if the lid member 10 is not rotated until reaching the removal position, the lid member 10 can be removed since the engagement itself is released at the stage where the engaged portion 10c is separated from the engaging claw 7d. However, the amount of deformation of the moving piece 10m is large in this state. A burden is applied to the moving piece 10m upon removal. Therefore, as in the embodiment, it is preferable to provide the removal position.

The rotation of the lid member 10 in the direction D2 is not particularly restricted in the state where the lid member 10 is mounted on the protrusion 3. However, the moving piece 10m is mounted onto the first inclined surface 7db and, accordingly, the lid member 10 is substantially pushed back by the elasticity of the moving piece 10m to the engagement position (that is, the direction D4). Therefore, the lid member 10 is prevented from being easily rotated to the engagement position. With this configuration, for example, the moving piece 10m is made thicker to increase a coefficient of elasticity. Accordingly, it becomes difficult for the lid member 10 to leave the engagement position. However, if the fuel tank 1 is expected to be placed in a very vibrant environment, for example, a regulating piece for rotation prevention is formed in advance on an outer peripheral surface of the flange portion 10b (see FIG. 3(b) or the like). This is fastened with a screw or the like on the outer surface of the tank body 2. Accordingly, whirl-stop is realized.

The first notch portion 10f is formed in such a manner as to have a circumferential width that allows the entrance of "part of the engaging claw 7d (the side, which protrudes radially inward, of the engaging claw 7d)" including the protrusion end 7da. However, the "entire engaging claw 7d" dose not enter the first notch portion 10f. Therefore, at the removal position, a fixing piece 10r of the second tubular portion 10a, which is sandwiched circumferentially between two moving pieces 10m, is mounted onto the first inclined surface 7db of the engaging claw 7d to be biased radially inward (a slight deformation occurs in part of the fixing piece 10r as illustrated in FIG. 10(c)). As a result, the lid member 10 is in the state of not coming out of the mouth member 7 easily (the state where a relatively loose restraint force is occurring). On the other hand, as described above, the lid member 10 is biased upward by the biasing member 16. Accordingly, the biasing force by the biasing member 16 (see FIG. 9(a)) is balanced with the restraint force to allow removal of the lid member 10 with an appropriate force.

Naturally, the width of the first notch portion 10f may be configured in such a manner as to agree substantially and circumferentially with the width of the engaging claw 7d. In this case, the biasing force by the biasing member 16 is made slightly weak to adjust a necessary force to remove the lid member 10.

In this manner, according to the embodiment, the lid member 10 is configured to be removable from the protrusion 3 via the mouth member 7. It becomes possible to mount the lid member 10 on the protrusion 3 with the simple operation of inserting the lid member 10 axially into the protrusion 3. In the state where the lid member 10 is mounted, the lid member 10 can be removed from the protrusion 3 with the simple operation of rotating the lid member 10 circumferentially. Consequently, the functional component such as the fuel pump unit 15 (see FIG. 2) fixed to the lid member 10 can be readily replaced.

As described above, the engaged portion 10c is formed as a through hole penetrating the moving piece 10m from the front through the back. A non-penetrating recess that is recessed in an outer peripheral surface (see FIG. 3(b)) of the moving piece 10m may be provided instead of the through hole to serve as the engaged portion 10c.

Figure 11:
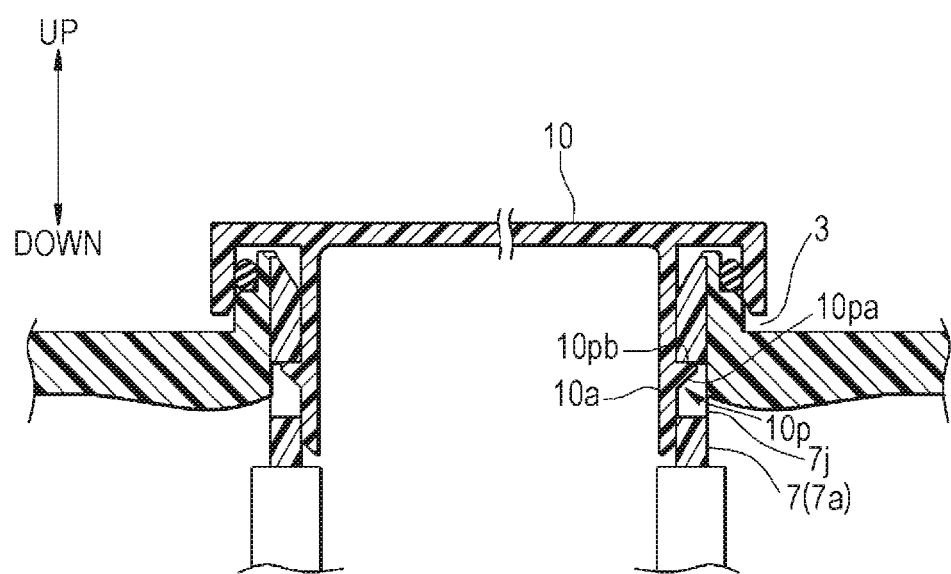
FIG. 11 is a cross-sectional view illustrating a modification of a configuration that engages the lid member with the mouth member.

FIG. 11 is a cross-sectional view illustrating a modification of the configuration that engages the lid member 10 with the mouth member 7. In the above-mentioned example, while the engaging claws 7d are provided to the mouth member 7, the engaged portions 10c are formed on the lid member 10. In the modification, as illustrated, through holes forming engaged portions 7j are formed in the first tubular portion 7a of the mouth member 7. On the other hand, engaging claws 10p protruding from an outer peripheral surface of the second tubular portion 10a are provided to the lid member 10. In other words, in the configuration illustrated in the modification, a through hole is formed in a portion provided with the engaging claw 7d in FIG. 10(a) to serve as the engaged portion 7j. A portion where the engaged portion 10c is formed in FIG. 10(b) is provided with the engaging claw 10p protruding radially outward.

The configuration of the engaging claw 10p, and the specific configuration of the engaged portion 7j are basically the same as those described using FIGS. 10(a) and 10(b). However, the modification is different in the point that a second inclined surface 10pa is formed at a lower part of the engaging claw 10p and a parallel surface 10pb is formed at an upper part thereof. Also in the modification, the lid member 10 is designed to be readily removable from the protrusion 3. The lid member 10 is inserted axially into the protrusion 3 to be readily mounted by snap-fit. The lid member 10 is rotated circumferentially in the mounted state to allow removal of the lid member 10. Also in the modification, it does not matter that a recess recessed in the inner peripheral surface of the first tubular portion 7a of the mouth member 7 is provided instead of the through hole to serve as the engaged portion 7j.

Up to this point the specific embodiment of the present invention has been described. However, the embodiment is only presented by way of example. The present invention is not limited by the embodiment. For example, it has been described that the tank body 2 and the protrusion 3 are made of a single high-density polyethylene layer. However, they may have a multi-layer structure. Moreover, the mouth member 7 may be made of nylon instead of polyacetal.

Moreover, in the embodiment, the functional component such as the fuel pump unit 15 is mounted on the lid member 10. However, the presence or absence of the functional component does not at all influence the effects of the present invention. In other words, the lid member 10 may not include the functional component. However, in the embodiment, the functional component has the operation of biasing the lid member 10 upward and fixing it axially. Therefore, in a configuration where the lid member 10 is not provided with the functional component, it is preferable to provide alternative biasing means. Naturally, even if biasing unit is not provided, the axial seal structure exhibits sufficient sealing performance even when the lid member 10 is displaced in the up-and-down direction as is clear from the configuration illustrated in FIG. 5(b).

Moreover, the configuration of the fuel tank 1, the seal structure at the protrusion 3 of the fuel tank 1, the configuration of pinching off the resin at the edge of the mouth member 7 provided to the protrusion 3 upon blow molding, the configuration where the lid member 10 is made readily removable, and the like according to the present invention can be applied not only to the fuel tank 1 to be mounted in a passenger vehicle, but also to a general tank that stores liquid fluid-tightly or gas air-tightly.

Moreover, the seal structure is not on the precondition of the configuration that the lid member 10 is mounted by snap-fit on the mouth member 7. For example, a screw portion formed on the outer peripheral surface of the protrusion 3 may encourage the fit between the mouth member 7 and the lid member 10.

All the components illustrated in the above embodiment are not necessarily required. The components can be selected as appropriate as long as it falls within at least the scope of the present invention.

INDUSTRIAL APPLICABILITY

A seal structure for a fuel tank according to the present invention can block the fuel tank oil-tightly while promoting cost reduction with a simple configuration. Accordingly, the seal structure can be suitably used for general tanks that store liquid and the like, including the fuel tank.

DESCRIPTION OF REFERENCE SIGNS 1 fuel tank
2 tank body (fuel tank body)
3 protrusion
3a ring-shaped shoulder surface (supporting surface)
3b first sealing surface (outer peripheral surface)
4 opening end
4a opening portion
7 mouth member
7a first tubular portion
7d engaging claw
7da protrusion end
7db first inclined surface
7dc second inclined surface
7dd parallel surface
7de vertical surface
7e inclined surface
7f acute portion
9 sealing member
10 lid member
10a second tubular portion
10b flange portion
10c engaged portion
10d downward hanging portion (third tubular portion)
10f first notch portion
10g second notch portion
10i second sealing surface (inner peripheral surface)
10m moving piece
20 parison
20a hollow portion
21 mold
21f molding gap

The invention claimed is:

1. A seal structure for a fuel tank, comprising:
a tubular protrusion communicating with an inside of a resin fuel tank body and projecting from the fuel tank body;
a mouth member being fixed along an inner peripheral surface of the protrusion and including a first tubular portion;
a lid member including a second tubular portion inserted from one end into the mouth member along an inner peripheral surface of the first tubular portion, a flange portion covering an end of the second tubular portion and being extended on an outer peripheral side of the second tubular portion, and a third tubular portion extending from an outer peripheral side of the flange portion toward an insertion direction of the second tubular portion;
a supporting surface extending from an outer peripheral side of the protrusion or the fuel tank body in such a manner as to face a protruding direction of the protrusion; and
a ring-shaped sealing member supported on the supporting surface and held between an outer peripheral surface of the protrusion and an inner peripheral surface of the third tubular portion in a state where the lid member is attached to the mouth member, wherein
one of the first tubular portion and the second tubular portion is provided circumferentially with a plurality of engaging claws protruding toward the other,
the other of the first tubular portion and the second tubular portion is provided, at positions corresponding to the engaging claws, with engaged portions where the engaging claws enter,
the second tubular portion is inserted axially along the first tubular portion to engage the engaging claws in the engaged portions and mount the lid member on the protrusion, and
in the state where the lid member is mounted on the protrusion, the lid member is rotated circumferentially to separate the engaged portions from the engaging claws, and accordingly, the lid member is allowed to be removed from the protrusion.

2. The seal structure for a fuel tank according to claim 1, wherein
the supporting surface is a ring-shaped shoulder surface formed on the protrusion between an opening end of the protrusion and the mouth member, and the fuel tank body.

3. The seal structure for a fuel tank according to claim 1, wherein
the supporting surface is provided all around the protrusion.

4. The seal structure for a fuel tank according to claim 1, wherein
a gap is formed between an end of the protrusion in a projecting direction and the flange portion in a state where the lid member is mounted on the mouth member.

5. The seal structure for a fuel tank according to claim 1, wherein
the mouth member includes a resin material having higher hardness than a resin material included in the protrusion.

6. The seal structure for a fuel tank according to claim 1, wherein
an end of the mouth member includes an acute portion extended circumferentially at an edge on an opening end side where the protrusion is open, and an inclined surface inclined radially from the acute portion.

7. The seal structure for a fuel tank according to claim 6, wherein
the inclined surface is formed into a tapered shape such that an inner diameter of the mouth member is progressively increased toward an opening end of the mouth member.

8. The seal structure for a fuel tank according to claim 6, wherein
an edge of the protrusion is located on the acute portion or the inclined surface.

9. The seal structure for a fuel tank according to claim 8, wherein
a thickness of the protrusion on the acute portion or the inclined surface is formed to be thinner than that of the fuel tank body or a part of the protrusion other than a part of the protrusion on the acute portion or the inclined surface.

10. The seal structure for a fuel tank according to claim 1, wherein
each engaged portion includes a through hole penetrating the first tubular portion or the second tubular portion.

11. The seal structure for a fuel tank according to claim 1, wherein
each engaged portion includes a recess recessed in the inner peripheral surface of the first tubular portion or an outer peripheral surface of the second tubular portion.

12. The seal structure for a fuel tank according to claim 1, wherein
each engaging claw includes a first inclined surface inclined circumferentially from a protrusion end protruding from an inner surface of the first tubular portion toward an inner peripheral surface of the first tubular portion, or from a protrusion end protruding from an outer surface of the second tubular portion toward an outer peripheral surface of the second tubular portion.

13. The seal structure for a fuel tank according to claim 1, wherein
each engaging claw has a wedge shape including a parallel surface parallel to a radial direction of the first tubular portion, and a second inclined surface formed on a surface opposite to the parallel surface and progressively reduced in thickness in between with the parallel surface toward a direction in which the engaging claw protrudes.

14. The seal structure for a fuel tank according to claim 13, further comprising:
a predetermined functional component mounted on the lid member; and
a biasing member configured to bias the lid member, together with the functional component, from the inside of the fuel tank body toward an opening end of the protrusion, wherein
the biasing member brings the parallel surface and the engaged portion into axial contact with each other to fix the lid member to the protrusion.

15. The seal structure for a fuel tank according to claim 14, wherein
the second tubular portion has a plurality of notch portions extended axially from a distal end thereof, the notch portions being formed circumferentially, and
the engaging claw or the engaged portion is provided to a moving piece defined by two notch portions.

16. The seal structure for a fuel tank according to claim 15, wherein
the engaging claws are provided to the first tubular portion,
the engaged portions are provided to the second tubular portion, and
when the lid member is rotated circumferentially in the state where the lid member is mounted on the protrusion, each engaging claw enters the notch portion after being separated from each engaged portion to allow the lid member to be removed from the protrusion.

17. The seal structure for a fuel tank according to claim 16, wherein
when, in a state where the engaging claw and the engaged portion are in engagement, the notch portion on a circumferentially closer side to the first inclined surface of the engaging claw is a first notch portion, and the notch portion on a farther side is a second notch portion, the first notch portion has a circumferentially larger notch width than the second notch portion.

* * * * *